United States Patent
Kudo et al.

(10) Patent No.: US 8,946,344 B2
(45) Date of Patent: Feb. 3, 2015

(54) CURABLE RESIN COMPOSITIONS, COATINGS, AND LAMINATED PLASTICS INCLUDING THE SAME

(75) Inventors: Shinichi Kudo, Chiba (JP); Kouji Uemura, Sakura (JP); Yasuhiro Takada, Osaka (JP); Hidekazu Miyano, Warabi (JP); Ichiro Mihata, Kobe (JP)

(73) Assignee: DIC Corporation, Tokyo (JP)

( * ) Notice: Subject to any disclaimer, the term of this patent is extended or adjusted under 35 U.S.C. 154(b) by 208 days.

(21) Appl. No.: 13/121,805

(22) PCT Filed: Dec. 3, 2009

(86) PCT No.: PCT/JP2009/070305
§ 371 (c)(1),
(2), (4) Date: Mar. 30, 2011

(87) PCT Pub. No.: WO2010/067742
PCT Pub. Date: Jun. 17, 2010

(65) Prior Publication Data
US 2011/0178225 A1    Jul. 21, 2011

(30) Foreign Application Priority Data

Dec. 11, 2008   (JP) .................................. 2008-315542
Feb. 18, 2009   (JP) .................................. 2009-035162

(51) Int. Cl.
| | |
|---|---|
| C08L 75/00 | (2006.01) |
| C08L 83/00 | (2006.01) |
| C08G 77/00 | (2006.01) |
| C08F 290/14 | (2006.01) |
| C08F 283/12 | (2006.01) |
| C08G 18/40 | (2006.01) |
| C08G 18/61 | (2006.01) |
| C08G 18/62 | (2006.01) |
| C08G 18/63 | (2006.01) |
| C08G 77/20 | (2006.01) |
| C08G 77/458 | (2006.01) |
| C09D 175/04 | (2006.01) |
| C09D 183/10 | (2006.01) |

(52) U.S. Cl.
CPC .......... *C08F 290/148* (2013.01); *C08F 283/12* (2013.01); *C08F 290/14* (2013.01); *C08G 18/4063* (2013.01); *C08G 18/61* (2013.01); *C08G 18/6295* (2013.01); *C08G 18/63* (2013.01); *C08G 77/20* (2013.01); *C08G 77/458* (2013.01); *C09D 175/04* (2013.01); *C09D 183/10* (2013.01)
USPC ............ 524/507; 525/101; 525/123; 525/477

(58) Field of Classification Search
USPC ............................ 524/507; 525/101, 123, 477
See application file for complete search history.

(56) References Cited

U.S. PATENT DOCUMENTS

| | | | | |
|---|---|---|---|---|
| 5,731,402 | A | * | 3/1998 | Nishida et al. ................. 528/222 |
| 5,840,806 | A | * | 11/1998 | Komazaki et al. ............. 525/101 |
| 6,268,440 | B1 | * | 7/2001 | Kudo et al. ..................... 525/477 |
| 2009/0176905 | A1 | | 7/2009 | Matsuzawa et al. |

FOREIGN PATENT DOCUMENTS

| | | | |
|---|---|---|---|
| JP | 5-214021 | A | 8/1993 |
| JP | 07-166124 | A | 6/1995 |
| JP | 11-279408 | A | 10/1999 |
| JP | 2000-034326 | A | 2/2000 |
| JP | 2001-011376 | A | 1/2001 |
| JP | 2001-098040 | A | 4/2001 |

(Continued)

OTHER PUBLICATIONS

Coatings Technology Handbook, third edition, CRC Press 2005, p. 97-1 to 97-9 (Koleske).*
International Search Report dated Mar. 16, 2010, issued on the related PCT (PCT/JP2009/070305) with English translation thereof.
Office Action mailed Jun. 24, 2010, issued on Japanese Patent Application No. 2010-513560 with English translation thereof.

(Continued)

*Primary Examiner* — Aiqun Li
(74) *Attorney, Agent, or Firm* — Edwards Wildman Palmer LLP; James E. Armstrong, IV; Nicholas J. DiCeglie, Jr.

(57) ABSTRACT

The present invention provides a curable resin composition including: a composite resin (A) in which a polysiloxane segment (a1), which has a structural unit represented by a general formula (1) and/or a general formula (2) as well as having a silanol group and/or a hydrolyzable silyl group, and a vinyl-based polymer segment (a2) having an alcoholic hydroxyl group are bound to each other through a bond represented by a general formula (3); and a polyisocyanate (B), wherein the content of said polysiloxane segment (a1) is from 10 to 60% by weight with respect to the total solid content of the curable resin composition, and the content of the polyisocyanate (B) is from 5 to 50% by weight with respect to the total solid content of the curable resin composition.

(1)

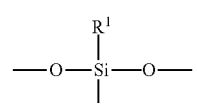

(2)

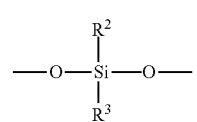

8 Claims, No Drawings

(56) References Cited

FOREIGN PATENT DOCUMENTS

| | | |
|---|---|---|
| JP | 2001-131378 A | 5/2001 |
| JP | 2002-194084 A | 7/2002 |
| JP | 2002-348536 A | 12/2002 |
| JP | 2003-040650 A | 2/2003 |
| JP | 2003-253209 A | 9/2003 |
| JP | 2004-026871 A | 1/2004 |
| JP | 2004-300196 A | 10/2004 |
| JP | 2006-316136 A | 11/2006 |
| JP | 2006-328354 A | 12/2006 |
| JP | 2008-106228 A | 5/2008 |
| JP | 2008-144001 A | 6/2008 |
| JP | 2008-208448 A | 9/2008 |
| JP | 2010-095657 A | 4/2010 |
| WO | WO-96/35755 A1 | 11/1996 |
| WO | WO-2006/095686 A1 | 9/2006 |

OTHER PUBLICATIONS

Notice of Allowance mailed Aug. 31, 2010, issued on Japanese Patent Application No. 2010-513560 with English translation thereof.

* cited by examiner

US 8,946,344 B2

CURABLE RESIN COMPOSITIONS, COATINGS, AND LAMINATED PLASTICS INCLUDING THE SAME

CROSS REFERENCE TO RELATED APPLICATIONS

This application is a U.S. National stage application pursuant to 35 U.S.C. §371 of International Application No. PCT/JP2009/070305, filed Dec. 3, 2009, which claims the benefit of priority of Japanese Patent Application No. 2008-315542, filed Dec. 11, 2008 and Japanese Patent Application No. 2009-035162, filed Feb. 18, 2009, the disclosures of each of which are expressly incorporated herein by reference in their entireties.

TECHNICAL FIELD

The present invention relates to polysiloxane curable resin compositions, coatings including these compositions, and laminated plastics the surfaces of which are protected by laminating layers made of these compositions.

BACKGROUND ART

Recently, plastics such as polyethylene terephthalate (PET) or like polyester resins, acrylic resins, ABS resins, polycarbonate resins, and fiber reinforced plastics (FRP) have been used in a wide range of products including exterior building components and exterior parts for automobiles, because of their lightweightness, impact resistance, processability, and recyclability. However, it is pointed out that these synthetic resins have a drawback in that yellowing and cracks can be seen when used outside over a long period of time, and a problem in that their surfaces are prone to be scratched as compared to glass and metallic materials.

To overcome these issues, there is a method in which the weather resistance is given to plastics by protecting their surfaces with coatings or the like. As to the coatings for use in this application, polysiloxane-based coatings, fluoroolefin-based coatings, and the like, have been reported so far. Polysiloxane-based coatings which do not emit toxic halogen gas when burned have been preferably used in a variety of fields such as exterior building works.

As a curable resin composition for use in such polysiloxane-based coatings, the inventors of the present invention have previously invented and disclosed a curable resin composition including: a resin prepared by condensing a polymer having both of a hydrolyzable silyl group and a specific functional group other than hydrolyzable silyl groups, with a specific polysiloxane having a silanol group and/or a hydrolyzable silyl group; and a curing agent (for example, refer to Patent Document 1). Cured coating films made of this curable resin composition are excellent in weather resistance and scratch resistance.

However, because this curable resin composition is thermally curable, it needs to be heated to as high a temperature as 140° C. so that excellent scratch resistance can be given to the cured coating film (refer to Example 1 of Patent Document 1). Accordingly, there is a problem in that when applied to a plastic material which is usually heat sensitive, the base material becomes deformed or discolored by heat.

To overcome these issues, the inventors of the present invention have invented and disclosed a UV-curable polysiloxane coating as a system that can be cured without high temperature heating (for example, refer to Patent Document 2). Specifically, it is a UV-curable coating including: a composite resin which includes a polysiloxane segment having a silanol group and/or a hydrolyzable silyl group as well as having a polymerizable double bond, and which also includes a polymer segment other than the polysiloxane segment; and a photopolymerization initiator. Because there are two hardening mechanisms, namely, UV curing and crosslink densification of the coating film through the condensation reaction of silanol groups and/or hydrolyzable silyl groups, it becomes possible to produce cured coating films which excel in scratch resistance, acid resistance, alkali resistance, and solvent resistance, and it also becomes possible to suitably use this coating for application to base materials, such as exterior coatings for buildings and plastics, which have been so far difficult to use with thermally curable resin compositions as they are susceptible to heat deformation.

However, this UV-curable coating is not expected to be used under quite severe conditions that are equivalent to exposure to the outside over a long period as long as ten or more years. For example, there has been revealed a problem in that a cured coating film produced by the method described in Example 1 became cracked after an accelerated weather resistance test that corresponded to ten years exposure to the outside. Furthermore, another problem has also been revealed in that, for example, when a cured coating film produced by the method described in Example 3 was directly formed on a polyethylene terephthalate (PET) base material or a polycarbonate base material, the adhesion between the base material and the cured coating film was considerably deteriorated after a severe humidity resistance test.

On the other hand, as a method for giving weather resistance and scratch resistance to the outermost layer made of a synthetic resin that is relatively resistant to heat deformation such as a polycarbonate resin, for example, there is disclosed a method in which a polycarbonate base material is coated with an acrylic resin as a first layer and a thermally curable coating film layer having a specific organosiloxane resin composition is coated thereon as a second layer (for example, refer to Patent Document 3).

However, this method is difficult to apply to a synthetic resin that is quite susceptible to heat deformation such as polyethylene terephthalate (PET), and also a problem is pointed out in that the outermost layer is fractured at the time of a bending operation.

Patent Document 1: International Publication No. WO/1996/035755 Pamphlet
Patent Document 2: Japanese Unexamined Patent Application, First Publication No. 2006-328354
Patent Document 3: Japanese Unexamined Patent Application, First Publication No. 2004-026871

DISCLOSURE OF INVENTION

It is an object of the present invention to provide: highly practical curable resin compositions having both long term weather resistance (specifically, crack resistance) outside and excellent scratch resistance, as well as being capable of forming cured coating films which excel in adhesion to a plastic material without high temperature heating; coatings including these curable resin compositions; and laminated plastics the surfaces of which are protected by laminating layers made of these compositions.

The inventors of the present invention have conducted intensive studies. As a result, they discovered that a radiation curable resin composition, in which the content of a polysiloxane segment is set within a specific range, and in which an alcoholic hydroxyl group and an isocyanate group coexist in a system, has both long term weather resistance (specifically, crack resistance) outside and excellent scratch resistance, and furthermore, is capable of forming cured coating films which excel in adhesion to a plastic material without high temperature heating. Thus, they have achieved the above-mentioned object.

By having the polysiloxane segment within a specific range in the radiation curable resin composition, it becomes possible even for a coating film produced by hardening not with high temperature heating but with radiation such as UV light, to have both excellent scratch resistance and high adhesion to a plastic base material.

In addition, it was also discovered that, by having an alcoholic hydroxyl group and an isocyanate group coexist in the radiation curable resin composition, even a coating film produced by hardening not with high temperature heating but with radiation such as UV light, can be prevented from being cracked under long term exposure to the outside.

That is, the present invention provides a curable resin composition including:

a composite resin (A) in which a polysiloxane segment (a1), which has a structural unit represented by a general formula (1) and/or a general formula (2) as well as having a silanol group and/or a hydrolyzable silyl group, and a vinyl-based polymer segment (a2) having an alcoholic hydroxyl group are bound to each other through a bond represented by a general formula (3); and a polyisocyanate (B), wherein the content of the polysiloxane segment (a1) is from 10 to 60% by weight with respect to the total solid content of the curable resin composition, and the content of the polyisocyanate (B) is from 5 to 50% by weight with respect to the total solid content of the curable resin composition.

[Formula 1]

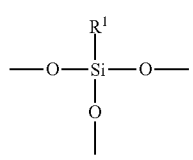

(1)

[Formula 2]

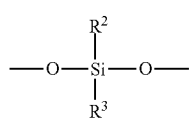

(2)

(In the general formulas (1) and (2), $R^1$, $R^2$, and $R^3$ represent, each independently, any one of: a group having a polymerizable double bond selected from the group consisting of $-R^4-CH=CH_2$, $-R^4-C(CH_3)=CH_2$, $-R^4-O-CO-C(CH_3)=CH_2$, and $-R^4-O-CO-CH=CH_2$ (provided that $R^4$ represents a single bond or an alkylene group of 1 to 6 carbon atoms); an alkyl group of 1 to 6 carbon atoms; a cycloalkyl group of 3 to 8 carbon atoms; an aryl group; or an aralkyl group of 7 to 12 carbon atoms, wherein at least one of $R^1$, $R^2$, and $R^3$ is the group having a polymerizable double bond.)

[Formula 3]

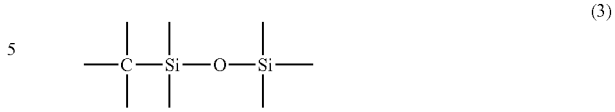

(3)

(In the general formula (3), the carbon atom constitutes a part of the vinyl-based polymer segment (a2), and the silicon atom which is only bound to the oxygen atom constitutes a part of the polysiloxane segment (a1).)

Moreover, the present invention provides a coating including the curable resin composition mentioned above.

In addition, the present invention provides a laminated plastic which is formed by laminating a layer made of the curable resin composition mentioned above.

The present invention is able to provide highly practical curable resin compositions having both long term weather resistance (specifically, crack resistance) outside and excellent scratch resistance, as well as being capable of forming cured coating films which excel in adhesion to a plastic material without high temperature heating. The coatings including these curable resin compositions are particularly useful as coatings for application to base materials such as exterior coatings for buildings which are required to be weather resistant for a long period of time and plastics which are susceptible to heat deformation. The laminated plastics, which are formed by laminating a layer made of the curable resin compositions of the present invention, have both long term weather resistance (specifically, crack resistance) outside and excellent scratch resistance.

BEST MODE FOR CARRYING OUT THE INVENTION (Composite Resin (A))

The composite resin (A) used in the present invention is a composite resin (A) in which a polysiloxane segment (a1), which has a structural unit represented by the general formula (1) and/or the general formula (2) as well as having a silanol group and/or a hydrolyzable silyl group (hereunder, simply referred to as a polysiloxane segment (a1)), and a vinyl-based polymer segment (a2) having an alcoholic hydroxyl group (hereunder, simply referred to as a vinyl-based polymer segment (a2)) are bound to each other through a bond represented by the general formula (3). The bond represented by the general formula (3) is preferable because it offers particularly excellent alkali resistance to the coating film to be formed.

[Formula 4]

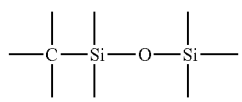

(3)

The silanol group and/or the hydrolyzable silyl group held by the polysiloxane segment (a1) that will be described later, and the silanol group and/or the hydrolyzable silyl group held by the vinyl-based polymer segment (a2) that will be described later, are subjected to a dehydration and condensation reaction, thereby generating the bond represented by the general formula (3). Therefore, in the general formula (3), the carbon atom constitutes a part of the vinyl-based polymer segment (a2), and the silicon atom which is only bound to the oxygen atom constitutes a part of the polysiloxane segment (a1).

The form of the composite resin (A) can be exemplified by; a composite resin having a graft structure in which the polysiloxane segment (a1) is chemically bound as a side chain of the polymer segment (a2), a composite resin having a block structure in which the polymer segment (a2) and the polysiloxane segment (a1) are chemically bound to each other, or the like.

(Polysiloxane Segment (a1))

The polysiloxane segment (a1) of the present invention is a segment having a structural unit represented by the general formula (1) and/or the general formula (2) as well as having a silanol group and/or a hydrolyzable silyl group. The structural unit represented by the general formula (1) and/or the general formula (2) contains a group having a polymerizable double bond.

(Structural Unit Represented by the General Formula (1) and/or the General Formula (2))

The structural unit represented by the general formula (1) and/or the general formula (2) includes a group having a polymerizable double bond as an essential component.

Specifically, $R^1$, $R^2$, and $R^3$ in the general formulas (1) and (2) represent, each independently, any one of: a group having a polymerizable double bond selected from the group consisting of —$R^4$—CH=CH$_2$, —$R^4$—C(CH$_3$)=CH$_2$, —$R^4$—O—CO—C(CH$_3$)=CH$_2$, and —$R^4$—O—CO—CH=CH$_2$ (provided that $R^4$ represents a single bond or an alkylene group of 1 to 6 carbon atoms); an alkyl group of 1 to 6 carbon atoms; a cycloalkyl group of 3 to 8 carbon atoms; an aryl group; or an aralkyl group of 7 to 12 carbon atoms, wherein at least one of $R^1$, $R^2$, and $R^3$ is the group having the polymerizable double bond. In addition, the alkylene group of 1 to 6 carbon atoms in $R^4$ can be exemplified by a methylene group, an ethylene group, a propylene group, an isopropylene group, a butylene group, an isobutylene group, a sec-butylene group, a tert-butylene group, a pentylene group, an isopentylene group, a neopentylene group, a tert-pentylene group, a 1-methylbutylene group, a 2-methylbutylene group, a 1,2-dimethylpropylene group, a 1-ethylpropylene group, a hexylene group, an isohexylene group, a 1-methylpentylene group, a 2-methylpentylene group, a 3-methylpentylene group, a 1,1-dimethylbutylene group, a 1,2-dimethylbutylene group, a 2,2-dimethylbutylene group, a 1-ethylbutylene group, a 1,1,2-trimethylpropylene group, a 1,2,2-trimethylpropylene group, a 1-ethyl-2-methylpropylene group, a 1-ethyl-1-methylpropylene group, or the like. Of these, it is preferable that $R^4$ represents a single bond or an alkylene group of 2 to 4 carbon atoms because the raw materials are readily available.

Moreover, the alkyl group of 1 to 6 carbon atoms can be exemplified by a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, a 1-ethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, a 1-ethyl-1-methylpropyl group, or the like.

Furthermore, the cycloalkyl group of 3 to 8 carbon atoms can be exemplified by a cyclopropyl group, a cyclobutyl group, a cyclopentyl group, a cyclohexyl group, or the like. The aryl group can be exemplified by a phenyl group, a naphthyl group, a 2-methylphenyl group, a 3-methylphenyl group, a 4-methylphenyl group, a 4-vinylphenyl group, a 3-isopropylphenyl group, or the like.

The aralkyl group of 7 to 12 carbon atoms can be exemplified by a benzyl group, a diphenylmethyl group, a naphthylmethyl group, or the like.

In addition, the phrase "at least one of $R^1$, $R^2$, and $R^3$ is the group having a polymerizable double bond" specifically means that: $R^1$ is the group having a polymerizable double bond when the polysiloxane segment (a1) has a structural unit represented by the general formula (1) alone; either one or both of $R^2$ and $R^3$ is the group having a polymerizable double bond when the polysiloxane segment (a1) has a structural unit represented by the general formula (2) alone; or at least one of $R^1$, $R^2$, and $R^3$ is the group having a polymerizable double bond when the polysiloxane segment (a1) has both types of structural units represented by the general formula (1) and the general formula (2).

In the present invention, it is preferable that the number of the polymerizable double bonds existing in the polysiloxane segment (a1) is 2 or more, more preferably 3 to 200, and yet more preferably 3 to 50, in which case, coating films having excellent scratch resistance can be obtained. Specifically, the scratch resistance can be given as desired if the content of the polymerizable double bond in the polysiloxane segment (a1) is from 3 to 20% by weight.

Here, the content of the polymerizable double bond is calculated under an assumption that the molecular weight of a group having —CH=CH$_2$ is 27 and the molecular weight of a group having —C(CH$_3$)=CH$_2$ is 41.

The structural unit represented by the general formula (1) and/or the general formula (2) is a polysiloxane structural unit of a three dimensional network structure where two or three linking bonds of silicon are associated with crosslink formation. Although such a three dimensional network structure is formed, the network structure is not dense. Therefore, no gelation will occur during the production process, and the resultant composite resin will have better storage stability for a long period of time.

(Silanol Group and/or Hydrolyzable Silyl Group)

In the present invention, the silanol group refers to a silicon-containing group which has a hydroxyl group directly bound to a silicon atom. Specifically speaking, it is preferable that the silanol group is a silanol group generated by bonding between a hydrogen atom and an oxygen atom having a linking bond of the structural unit represented by the general formula (1) and/or the general formula (2).

In the present invention, the hydrolyzable silyl group refers to a silicon-containing group which has a hydrolyzable group directly bound to a silicon atom. Specifically speaking, it can be exemplified by a group represented by the general formula (4).

[Formula 5]

(4)

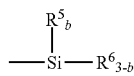

(In the general formula (4), $R^5$ represents a monovalent organic group such as an alkyl group, an aryl group, or an aralkyl group, and $R^6$ represents a hydrolyzable group selected from the group consisting of a halogen atom, an alkoxy group, an acyloxy group, a phenoxy group, an aryloxy group, a mercapto group, an amino group, an amide group, an aminooxy group, an iminooxy group, and an alkenyloxy group. The symbol b represents an integer of 0 to 2.)

In $R^5$, the alkyl group can be exemplified by a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, a 1-ethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, a 1-ethyl-1-methylpropyl group, or the like.

In addition, the aryl group can be exemplified by a phenyl group, a naphthyl group, a 2-methylphenyl group, a 3-methylphenyl group, a 4-methylphenyl group, a 4-vinylphenyl group, a 3-isopropylphenyl group, or the like.

Furthermore, the aralkyl group can be exemplified by a benzyl group, a diphenylmethyl group, a naphthylmethyl group, or the like.

In $R^6$, the halogen atom can be exemplified by a fluorine atom, a chlorine atom, a bromine atom, an iodine atom, or the like.

The alkoxy group can be exemplified by a methoxy group, an ethoxy group, a propoxy group, an isopropoxy group, a butoxy group, a sec-butoxy group, a tert-butoxy group, or the like.

In addition, the acyloxy group can be exemplified by formyloxy, acetoxy, propanoyloxy, butanoyloxy, pivaloyloxy, pentanoyloxy, phenylacetoxy, acetoacetoxy, benzoyloxy, naphthoyloxy, or the like.

Moreover, the aryloxy group can be exemplified by phenyloxy, naphthyloxy, or the like.

The alkenyloxy group can be exemplified by a vinyloxy group, an allyloxy group, a 1-propenyloxy group, an isopropenyloxy group, a 2-butenyloxy group, a 3-butenyloxy group, a 2-pentenyloxy group, a 3-methyl-3-butenyloxy group, a 2-hexenyloxy group, or the like.

When the hydrolyzable group represented by $R^6$ is hydrolyzed, the hydrolyzable silyl group represented by the general formula (4) turns to be a silanol group. In particular, a methoxy group or an ethoxy group is preferred because they are very hydrolyzable.

In addition, the hydrolyzable silyl group is specifically preferable to be a hydrolyzable silyl group in which an oxygen atom having a linking bond of the structural unit represented by the general formula (1) and/or the general formula (2) is bound to or replaced by the hydrolyzable group mentioned above.

The silanol group and the hydrolyzable silyl group are capable of forming coating films which excel in solvent resistance or like properties, because, upon the formation of a coating film by means of UV curing, a hydrolysis and condensation reaction proceeds between hydroxyl groups in the silanol group, or the hydrolyzable groups in the hydrolyzable silyl group, in parallel to the UV curing reaction, which causes crosslink densification within the polysiloxane structure of the formed coating film.

Moreover, the polysiloxane segment (a1) having the silanol group or the hydrolyzable silyl group as mentioned above and the vinyl-based polymer segment (a2) having an alcoholic hydroxyl group that will be described later are used for bonding through a bond represented by the general formula (3).

The polysiloxane segment (a1) is not specifically limited except that it should have the structural unit represented by the general formula (1) and/or the general formula (2) as well as having a silanol group and/or a hydrolyzable silyl group. The polysiloxane segment (a1) may also include a different group.

For example, the polysiloxane segment (a1) may be such that a structural unit in which $R^1$ of the general formula (1) represents the above-mentioned group having a polymerizable double bond, and a structural unit in which $R^1$ of the general formula (1) represents a methyl or such alkyl group, coexist together; a structural unit in which $R^1$ of the general formula (1) represents the above-mentioned group having a polymerizable double bond, a structural unit in which $R^1$ of the general formula (1) represents a methyl group or such an alkyl group, and a structural unit in which $R^2$ or $R^3$ of the general formula (2) represents a methyl group or such an alkyl group, coexist together; or a structural unit in which $R^1$ of the general formula (1) represents the above-mentioned group having a polymerizable double bond, and a structural unit in which $R^2$ or $R^3$ of the general formula (2) represents a methyl group or such an alkyl group, coexist together; without any specific limitations.

Specifically, the polysiloxane segment (a1) can be exemplified by those having the following structures, or the like.

[Formula 6]

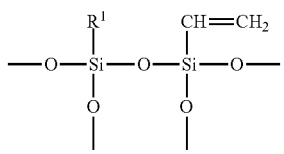

[Formula 7]

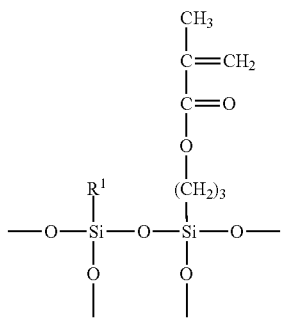

[Formula 8]

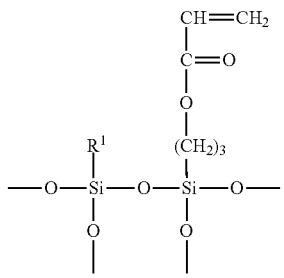

[Formula 9]

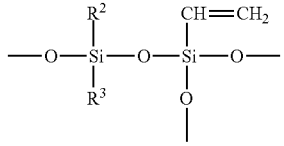

-continued

[Formula 10]
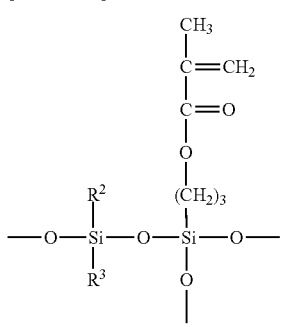

[Formula 11]
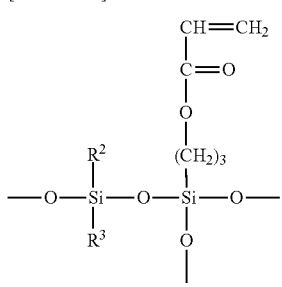

[Formula 12]
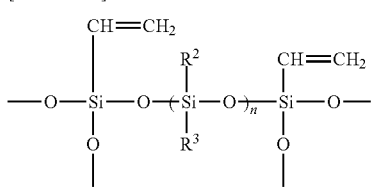

[Formula 13]
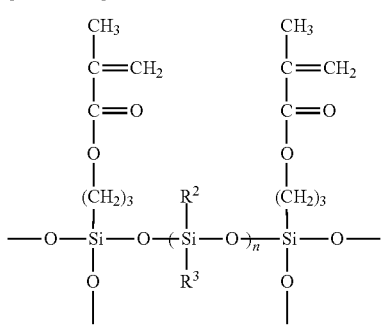

[Formula 14]
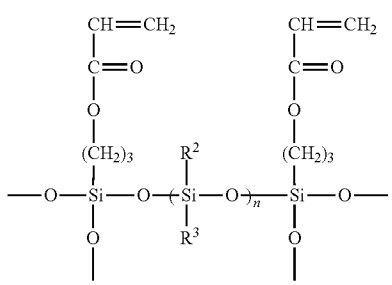

The present invention is characterized in including the polysiloxane segment (a1) at 10 to 60% by weight with respect to the total solid content of the curable resin composition, which makes it possible to have both the properties of weather resistance and adhesion to a plastic or such a base material.

(Vinyl-Based Polymer Segment (a2) Having an Alcoholic Hydroxyl Group)

The vinyl-based polymer segment (a2) of the present invention is a vinyl polymer segment such as an acrylic polymer, a fluoroolefin polymer, a vinyl ester polymer, an aromatic vinyl polymer, and a polyolefin polymer, having an alcoholic hydroxyl group. Of these, preferred is an acrylic-based polymer segment in which (meth)acrylic monomers having an alcoholic hydroxyl group are copolymerized, as it offers excellent transparency and glossiness to the coating film to be formed.

The (meth)acrylic monomer having an alcoholic hydroxyl group can be specifically exemplified by 2-hydroxyethyl (meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethyl fumarate, mono-2-hydroxyethylmonobutyl fumarate, polyethylene glycol mono(meth)acrylate, polypropylene glycol mono(meth)acrylate, a variety of hydroxyalkyl esters of $\alpha,\beta$-ethylene-based unsaturated carboxylic acids such as "PLACCEL FM" and "PLACCEL FA" (caprolactone-modified monomers of Daicel Chemical Industries Ltd.), or $\epsilon$-caprolactone adducts thereof, or the like.

Of these, 2-hydroxyethyl(meth)acrylate is preferred as it causes an easy reaction.

It is preferable to properly determine the amount of the alcoholic hydroxyl group by calculation from the actually added amount of the polyisocyanate (B), because the content of the polyisocyanate (B), which will be described later, should be within a range of 5 to 50% by weight with respect to the total solid content of the curable resin composition.

In addition, as will be described later, it is more preferable in the present invention to additionally use a UV curable monomer having an alcoholic hydroxyl group. Accordingly, the amount of the alcoholic hydroxyl group in the vinyl-based polymer segment (a2) having an alcoholic hydroxyl group can be determined by including the amount of UV curable monomer having an alcoholic hydroxyl group to be used together. Substantially, it is preferable that the content the alcoholic hydroxyl group be within a range of 30 to 300 in terms of the hydroxyl value of the vinyl-based polymer segment (a2).

The other copolymerizable (meth)acrylic monomers are not specifically limited, and publicly known monomers can be employed. In addition, vinyl monomers are also copolymerizable. For example, there can be enumerated: alkyl (meth)acrylates having an alkyl group of 1 to 22 carbon atoms, such as methyl(meth)acrylate, ethyl(meth)acrylate, n-propyl(meth)acrylate, n-butyl(meth)acrylate, isobutyl (meth)acrylate, tert-butyl(meth)acrylate, 2-ethylhexyl(meth) acrylate, and lauryl(meth)acrylate; aralkyl(meth)acrylates such as benzyl(meth)acrylate and 2-phenylethyl(meth)acrylate; cycloalkyl(meth)acrylates such as cyclohexyl(meth) acrylate and isobornyl(meth)acrylate; $\omega$-alkoxyalkyl(meth) acrylates such as 2-methoxyethyl(meth)acrylate and 4-methoxybutyl(meth)acrylate; aromatic vinyl-based monomers such as styrene, p-tert-butylstyrene, $\alpha$-methylstyrene, and vinyl toluene; vinyl carboxylate esters such as vinyl acetate, vinyl propionate, vinyl pivalate, and vinyl benzoate; alkyl crotonate esters such as methyl crotonate and ethyl crotonate; dialkyl esters of unsaturated dibasic acid such as dimethyl malate, di-n-butyl malate, dimethyl fumarate, and dimethyl itaconate; $\alpha$-olefines such as ethylene and propylene; fluoroolefins such as vinylidene fluoride, tetrafluoroethylene, hexafluoropropylene, and chlorotrifluoro ethylene; alkyl vinyl ethers such as ethyl vinyl ether and n-butyl vinyl ether; cycloalkyl vinyl ethers such as cyclopentyl vinyl ether and cyclohexyl vinyl ether; and tertiary amide group-containing monomers such as N,N-dimethyl(meth)acrylamide, N-(meth)acryloyl morpholine, N-(meth)acryloylpyrrolidine, and N-vinylpyrrolidone.

For copolymerizing these monomers, the polymerization method, the solvent, and the polymerization initiator are not specifically limited, and publicly known methods can be applied to obtain the vinyl-based polymer segment (a2). For example, the vinyl-based polymer segment (a2) can be obtained by a variety of polymerization methods such as the bulk radical polymerization method, the solution radical polymerization method, or the non-aqueous dispersion radical polymerization method, with use of a polymerization initiator such as 2,2'-azobis(isobutyronitrile), 2,2'-azobis(2,4-dimethylvaleronitrile), 2,2'-azobis(2-methylbutyronitrile), tert-butyl peroxypivalate, tent-butyl peroxybenzoate, tert-butylperoxy-2-ethylhexanoate, di-tert-butyl peroxide, cumene hydroperoxide, diisopropyl peroxycarbonate, and the like.

The number average molecular weight of the vinyl-based polymer segment (a2) is preferably within a range of 500 to 200,000, in terms of the number average molecular weight (hereunder, abbreviated as Mn), as it can prevent thickening or gelation during the production process of the composite resin (A) and can offer excellent durability to the coating film when formed. It is more preferable to set the Mn value within a range of 700 to 100,000, and more preferably within a range of 1,000 to 50,000.

Moreover, the vinyl-based polymer segment (a2) has a silanol group and/or a hydrolyzable silyl group which is directly bound to a carbon bond inside the vinyl-based polymer segment (a2), so as to form a composite resin (A) in which the segment (a2) and the polysiloxane segment (a1) are bound to each other through the bond represented by the general formula (3). Since the silanol group and/or the hydrolyzable silyl group turn out to be the bond represented by the general formula (3) during the production process of the composite resin (A) that will be described later, there is almost no existence of the silanol group and/or the hydrolyzable silyl group in the vinyl-based polymer segment (a2) in the composite resin (A) as the final product. However, it is not a problem at all even if the silanol group and/or the hydrolyzable silyl group remains in the vinyl-based polymer segment (a2). When forming a coating film by means of UV curing, a hydrolysis and condensation reaction proceeds between hydroxyl groups in the silanol group, or hydrolyzable groups in the hydrolyzable silyl group, in parallel to the UV curing reaction, which causes crosslink densification within the polysiloxane structure in the formed coating film, and enables the formation of coating films which excel in the solvent resistance or like property.

Specifically speaking, the vinyl-based polymer segment (a2) having a silanol group and/or a hydrolyzable silyl group directly bound to a carbon bond is obtained by copolymerizing a (meth)acrylic monomer having an alcoholic hydroxyl group as mentioned above, a usual monomer as mentioned above, and a vinyl-based monomer having a silanol group and/or a hydrolyzable silyl group directly bound to a carbon bond.

The vinyl-based monomer having a silanol group and/or a hydrolyzable silyl group directly bound to a carbon bond can be exemplified by vinyltrimethoxysilane, vinyltriethoxysilane, vinylmethyldimethoxysilane, vinyltri(2-methoxyethoxy)silane, vinyltriacetoxysilane, vinyltrichlorosilane, 2-trimethoxysilylethyl vinyl ether, 3-(meth)acryloyloxypropyltrimethoxysilane, 3-(meth)acryloyloxypropyltriethoxysilane, 3-(meth)acryloyloxypropylmethyldimethoxysilane, 3-(meth)acryloyloxypropyltrichlorosilane, or the like. Of these, vinyltrimethoxysilane and 3-(meth)acryloyloxypropyltrimethoxysilane are preferred as they cause an easy hydrolysis reaction and an easy removal of by-products after the reaction.

(Production Method of Composite Resin (A))

Specifically speaking, the composite resin (A) for use in the present invention is produced by the method described in the (Method 1) to (Method 3) below.

(Method 1)

A (meth)acrylic monomer having an alcoholic hydroxyl group as mentioned above, a usual (meth)acrylic monomer as mentioned above, and a vinyl-based monomer having a silanol group and/or a hydrolyzable silyl group directly bound to a carbon bond as mentioned above, are copolymerized to thereby produce a vinyl-based polymer segment (a2) having a silanol group and/or a hydrolyzable silyl group directly bound to a carbon bond. This is mixed with a silane compound having a silanol group and/or a hydrolyzable silyl group as well as having a polymerizable double bond, with or without a usual silane compound as required, to effect a hydrolysis and condensation reaction.

In this method, the silanol group or the hydrolyzable silyl group held by the silane compound having a silanol group and/or a hydrolyzable silyl group as well as having a polymerizable double bond, and the silanol group and/or the hydrolyzable silyl group held by the vinyl-based polymer segment (a2) having a silanol group and/or a hydrolyzable silyl group directly bound to a carbon bond, are subjected to the hydrolysis and condensation reaction, thereby forming the polysiloxane segment (a1), and at the same time, yielding a composite resin (A) in which the polysiloxane segment (a1) and the vinyl-based polymer segment (a2) having an alcoholic hydroxyl group are composed through the bond represented by the general formula (3).

(Method 2)

The vinyl-based polymer segment (a2) having a silanol group and/or a hydrolyzable silyl group directly bound to a carbon bond is obtained in the same manner as that of Method 1.

On the other hand, a silane compound having a silanol group and/or a hydrolyzable silyl group as well as having a polymerizable double bond, with or without a usual silane compound as required, is subjected to a hydrolysis and condensation reaction, thereby forming the polysiloxane segment (a1). Then, the silanol group or the hydrolyzable silyl group held by the vinyl-based polymer segment (a2) and the silanol group and/or the hydrolyzable silyl group held by the polysiloxane segment (a1) are subjected to a hydrolysis and condensation reaction.

(Method 3)

The vinyl-based polymer segment (a2) having a silanol group and/or a hydrolyzable silyl group directly bound to a carbon bond is obtained in the same manner as that of Method 1. On the other hand, the polysiloxane segment (a1) is obtained in the same manner as that of Method 2. Furthermore, a silane compound which includes a silane compound having a polymerizable double bond, with or without a usual silane compound as required, is mixed therein, to effect a hydrolysis and condensation reaction.

The silane compound having a silanol group and/or a hydrolyzable silyl group as well as having a polymerizable double bond, for use in the (Method 1) to (Method 3) mentioned above can be specifically exemplified by vinyltrimethoxysilane, vinyltriethoxysilane, vinylmethyldimethoxysilane, vinyltri(2-methoxyethoxy)silane, vinyltriacetoxysilane, vinyltrichlorosilane, 2-trimethoxysilylethyl vinyl ether, 3-(meth)acryloyloxypropyltrimethoxysilane, 3-(meth)acryloyloxypropyltriethoxysilane, 3-(meth)acryloyloxypropylmethyldimethoxysilane, 3-(meth)acryloyloxypropyltrichlorosilane, or the like. Of these, vinyltrimethoxysilane and 3-(meth)acryloyloxypropyltrimethoxysilane are preferred as they cause an easy hydrolysis reaction and an easy removal of by-products after the reaction.

The usual silane compound for use in the (Method 1) to (Method 3) mentioned above can be specifically exemplified by: a variety of organotrialkoxysilanes such as methyltrimethoxysilane, methyltriethoxysilane, methyltri-n-butoxysilane, ethyltrimethoxysilane, n-propyltrimethoxysilane, iso-butyltrimethoxysilane, cyclohexyltrimethoxysilane, phenyltrimethoxysilane, and phenyltriethoxysilane; a variety of diorganodialkoxysilanes such as dimethyldimethoxysilane, dimethyldiethoxysilane, dimethyldi-n-butoxysilane, diethyldimethoxysilane, diphenyldimethoxysilane, methylcyclohexyldimethoxysilane, and methylphenyldimethoxysilane; and chlorosilanes such as methyltrichlorosilane, ethyltrichlorosilane, phenyltrichlorosilane, vinyltrichlorosilane, dimethyldichlorosilane, diethyldichlorosilane, and diphenyldichlorosilane. Of these, organotrialkoxysilane and diorganodialkoxysilane are preferred as they cause an easy hydrolysis reaction and an easy removal of by-products after the reaction.

In addition, it is also possible to additionally use a tetrafunctional alkoxysilane compound such as tetramethoxysilane, tetraethoxysilane, and tetra-n-propoxysilane, or a partial hydrolysis and condensation product of such a tetrafunctional alkoxysilane compound, to an extent that will not impair the effect of the present invention. When the tetrafunctional alkoxysilane compound or its partial hydrolysis and condensation product is additionally used, it is preferable to adjust the amount so that the content of silicon atoms held by the tetrafunctional alkoxysilane compound becomes within a range not exceeding 20 mol % with respect to the total amount of silicon atoms constituting the polysiloxane segment (a1), Moreover, it is also possible to additionally use an alkoxide compound of a non-silicon metal, such as boron, titanium, zirconium, or aluminum, together with the silane compound, to an extent that will not impair the effect of the present invention. For example, it is preferable to adjust the amount so that the content of metallic atoms held by the above-mentioned metal alkoxide compound is within a range not exceeding 25 mol % with respect to the total amount of silicon atoms constituting the polysiloxane segment (a1), The hydrolysis and condensation reaction in the (Method 1) to (Method 3) mentioned above refers to a condensation reaction in which a portion of the hydrolyzable group is hydrolyzed due to the influence of water or the like to thereby form a hydroxyl group, and subsequently the reaction proceeds between hydroxyl groups, or between a hydroxyl group and a hydrolyzable group. The hydrolysis and condensation reaction can be promoted by a publicly known method, although it is preferable to employ a method to promote the reaction by supplying water and a catalyst during the production process because it is easy and simple.

The catalyst to be used can be exemplified by: inorganic acids such as hydrochloric acid, sulfuric acid, and phosphoric acid; organic acids such as p-toluenesulfonic acid, monoisopropyl phosphate, and acetic acid; inorganic bases such as sodium hydroxide and potassium hydroxide; titanate esters such as tetraisopropyl titanate and tetrabutyl titanate; compounds including a variety of basic nitrogen atoms such as 1,8-diazabicyclo[5.4.0]undecene-7 (DBU), 1,5-diazabicyclo[4.3.0]nonene-5 (DBN), 1,4-diazabicyclo[2.2.2]octane (DABCO), tri-n-butylamine, dimethylbenzylamine, monoethanolamine, imidazole, and 1-methylimidazole; and a variety of quaternary ammonium salts such as a tetramethylammonium salt, a tetrabutylammonium salt, and a dilauryldimethylammonium salt, which have chloride, bromide, carboxylate, hydroxide, or the like, as a pairing anion; tin carboxylate salts such as dibutyltin diacetate, dibutyltin dioctoate, dibutyltin dilaurate, dibutyltin diacetylacetonato, tin octylate, or tin stearate; or the like. It is either possible to use a single type of catalyst alone, or a plurality of types of catalysts in combination.

The dose of the catalyst(s) is not specifically limited, although it is generally preferable to use within a range of 0.0001 to 10% by weight, more preferably within a range of 0.0005 to 3% by weight, and particularly preferably within a range of 0.001 to 1% by weight, with respect to the total amount of respective compounds having the silanol group or the hydrolyzable silyl group mentioned above.

In addition, the amount of water to be supplied is preferably 0.05 moles or greater, more preferably 0.1 moles or greater, and particularly preferably 0.5 moles or greater, with respect to 1 mole of the silanol group or the hydrolyzable silyl group held by the respective compounds having the silanol group or the hydrolyzable silyl group mentioned above.

These catalyst and water may be supplied either at the same time or one by one. Otherwise, it is also possible to supply a previously prepared mixture of the catalyst and water.

It is appropriate that the reaction temperature for carrying out the hydrolysis and condensation reaction in the (Method 1) to (Method 3) mentioned above be within a range of 0° C. to 150° C., and preferably within a range of 20° C. to 100° C. Moreover, the pressure for the reaction may be set at any condition of a normal pressure, a pressurized state, or a decompressed state. In addition, alcohol and water as by-products that could be generated in the hydrolysis and condensation reaction may be removed by distillation or such a method if necessary.

The preparation ratios of the respective compounds in the (Method 1) to (Method 3) mentioned above are appropriately selected according to the structure of the composite resin (A) as desired for use in the present invention. Of these, it is preferable to produce the composite resin (A) so that the content of the polysiloxane segment (a1) would be from 30 to 80% by weight, and more preferably from 30 to 75% by weight, as it offers excellent durability to the coating film to be formed.

In the (Method 1) to (Method 3) mentioned above, the specific method for composing the polysiloxane segment and the vinyl-based polymer segment in a block shape can be exemplified by a method in which: a vinyl-based polymer segment having a structure where the silanol group and/or the hydrolyzable silyl group mentioned above is/are held on one end or opposite ends of the polymer chain, is used as an intermediate; and, for example, in the case of (Method 1), this vinyl-based polymer segment is mixed with a silane compound having a silanol group and/or a hydrolyzable silyl group as well as having a polymerizable double bond, with or without a usual silane compound as required, to effect a hydrolysis and condensation reaction.

On the other hand, in the (Method 1) to (Method 3) mentioned above, the specific method for composing the polysiloxane segment into the vinyl-based polymer segment in a graft shape can be exemplified by a method in which: a vinyl-based polymer segment having a structure where the silanol group and/or the hydrolyzable silyl group mentioned above is/are randomly distributed relative to the principal chain of the vinyl-based polymer segment, is used as an intermediate; and, for example, in the case of (Method 2), the silanol group and/or the hydrolyzable silyl group held by the vinyl-based polymer segment and the silanol group and/or the hydrolyzable silyl group held by the polysiloxane segment are subjected to a hydrolysis and condensation reaction.
(Polyisocyanate (B))

The curable resin composition of the present invention contains a polyisocyanate (B) at 5 to 50% by weight with respect to the total solid content of the curable resin composition.

By containing the polyisocyanate within the above range, coating films that are particularly excellent in long term weather resistance (specifically, crack resistance) outside can be obtained. This can be attributed to an action to alleviate the stress concentration caused by hardening induced from the polymerizable double bond, because a urethane bond being a soft segment is formed by a reaction between the polyisocyanate and a hydroxyl group in the system (which is a hydroxyl group in the vinyl-based polymer segment (a2) and a hydroxyl group in the UV curable monomer having an alcoholic hydroxyl group that will be described later).

When the content of the polyisocyanate (B) is lower than 5% by weight with respect to the total solid content of the curable resin composition, cured coating films formed from this composition will be cracked over long term exposure to the outside, which is a problem. On the other hand, when the content of the polyisocyanate (B) is higher than 50% by weight with respect to the total solid content of the curable resin composition, the cured coating films will have a considerably lowered scratch resistance, which is also a problem.

The polyisocyanate (B) to be used is not specifically limited, and it is possible to use publicly known ones. However, it is preferable to use a polyisocyanate which has, as a main ingredient, an aromatic diisocyanate such as tolylene diisocyanate and diphenylmethane-4,4'-diisocyanate, or an aralkyl diisocyanate such as meta-xylylene diisocyanate and α,α,α',α'-tetramethyl-meta-xylylene diisocyanate, at a minimum amount, because they will cause yellowing in the cured coating film over long term exposure to the outside, which is a problem.

From the viewpoint of long term use outside, the polyisocyanate for use in the present invention is preferably an aliphatic polyisocyanate which has an aliphatic diisocyanate as a main ingredient. The aliphatic diisocyanate can be exemplified by tetramethylene diisocyanate, 1,5-pentamethylene diisocyanate, 1,6-hexamethylene diisocyanate (hereinunder, abbreviated as "HDI"), 2,2,4-(or 2,4,4)-trimethy-1,6-hexamethylene diisocyanate, lysine isocyanate, isophorone diisocyanate, hydrogenerated xylene diisocyanate, hydrogenerated diphenylmethane diisocyanate, 1,4-diisocyanate cyclohexane, 1,3-bis(diisocyanate methyl)cyclohexane, 4,4'-dicyclohexylmethane diisocyanate, or the like. Of these, particularly preferred is HDI from the viewpoint of crack resistance and cost.

The aliphatic polyisocyanate obtained from the aliphatic diisocyanate can be exemplified by an allophanate modified polyisocyanate, a biuret modified polyisocyanate, an adduct of a polyisocyanate, or an isocyanurate modified polyisocyanate, all of which can be suitably used.

The above-mentioned polyisocyanate may also use a so-called block polyisocyanate compound which is blocked by various kinds of blocking agents. Such blocking agents can be exemplified by alcohols such as methanol, ethanol, and lactate esters; phenolic hydroxyl group-containing compounds such as phenol and salicylate esters; amides such as ε-caprolactam and 2-pyrrolidone; oximes such as acetone oxime and methylethylketoxime; active methylene compounds such as methyl acetoacetate, ethyl acetoacetate, and acetylacetone; or the like.

The content of the isocyanate group in the polyisocyanate (B) is preferably from 3 to 30% by weight with respect to the total solid content of the polyisocyanate, from the point of crack resistance and scratch resistance of the cured coating film to be formed. When the content of the isocyanate group in (B) is lower than 3%, the reactivity of the polyisocyanate is low, which considerably lowers the scratch resistance of the cured coating film. When the content is higher than 30%, the molecular weight of the polyisocyanate becomes so small that the crack resistance due to stress alleviation will no longer be manifested. Therefore, care should be taken.

There is no need of heating or such a specific treatment for the reaction between the polyisoeyanate and the hydroxyl group in the system (this is the hydroxyl group in the vinyl-based polymer segment (a2) and the hydroxyl group in the UV curable monomer having an alcoholic hydroxyl group that will be described later). For example, if the curing is carried out by UV light, the reaction is gradually promoted by leaving the coating at room temperature after the UV irradiation. Moreover, if necessary, it is also possible to promote a reaction between the alcoholic hydroxyl group and the isocyanate by heating at 80° C. for several minutes to several hours (20 minutes to 4 hours) after the UV irradiation. In this case, a known urethanated catalyst may also be used as required. The urethanated catalyst is properly selected corresponding to the desired reaction temperature.
(Curable Resin Composition)

As mentioned above, since the curable resin composition of the present invention has a polymerizable double bond, this can be cured by either one or both of UV light and heat. Of these, it is preferable that the composition can be cured by UV light, for use as a surface protective coating of exterior building components or exterior automobile parts, which consist of polycarbonate or such plastic materials. Hereunder is a description of an example of a case where the curing is carried out by UV light, as a specific embodiment of the present invention.

It is preferable to use a photopolymerization initiator when curing the curable resin composition of the present invention by UV light. The photopolymerization initiator may be a known one, preferred examples of which can include one or more kinds of components selected from the group consisting of acetophenones, benzyl ketals, and benzophenones. The acetophenones can be exemplified by diethoxyacetophenone, 2-hydroxy-2-methyl-1-phenylpropane-1-one, 1-(4-isopropylphenyl)-2-hydroxy-2-methylpropane-1-one, 4-(2-hydroxyethoxy)phenyl-(2-hydroxy-2-propyl)ketone, or the like. The benzyl ketals can be exemplified by 1-hydroxycyclohexyl-phenyl ketone and benzyl dimethyl ketal. The benzophenones can be exemplified by benzophenone, o-methylbenzoylbenzoate, or the like. The benzoins can be exemplified by benzoin, benzoin methyl ether, benzoin isopropyl ether, or the like. It is either possible to use a single type of photopolymerization initiator (B) alone, or a plurality of types of photopolymerization initiators (B) in combination.

The amount of the photopolymerization initiator (B) is preferably from 1 to 15% by weight, and more preferably from 2 to 10% by weight, with respect to 100% by weight of the composite resin (A).

In addition, when UV curing is carried out, it is preferable to contain a polyfunctional (meth)acrylate as required. As mentioned above, the polyfunctional (meth)acrylate preferably has an alcoholic hydroxyl group because it is to be reacted with the polyisocyanate (B). Examples of the polyfunctional (meth)acrylate can include polyfunctional (meth)acrylates having two or more polymerizable double bonds within a molecule, which can be exemplified by 1,2-ethanediol diacrylate, 1,2-propanediol diacrylate, 1,4-butanediol diacrylate, 1,6-hexanediol diacrylate, dipropylene glycol diacrylate, neopentyl glycol diacrylate, tripropylene glycol diacrylate, trimethylol propane diacrylate, trimethylol propane triacrylate, tris(2-acryloyloxy)isocyanurate, pentaerythritol triacrylate, pentaerythritol tetraacrylate, di(trimethylol propane)tetraacrylate, di(pentaerythritol)pentaacrylate, di(pentaerythritol)hexaacrylate, or the like. In addition, examples of the polyfunctional acrylate can also include a urethane acrylate, a polyester acrylate, an epoxy acrylate, or the like. It is either possible to use a single type of them alone, or a plurality of types of them in combination.

In particular, pentaerythritol triacrylate and dipentaerythritol pentaacrylate are preferred from the viewpoint of scratch resistance of the cured coating film, and the viewpoint of improvement in the crack resistance induced by a reaction with the polyisocyanate.

Moreover, it is also possible to additionally use a monofunctional (meth)acrylate, together with the polyfunctional (meth)acrylate mentioned above. Such a monofunctional (meth)acrylate can be exemplified by: hydroxyl group-containing (meth)acrylate esters such as hydroxyethyl(meth)acrylate, hydroxypropyl(meth)acrylate, hydroxybutyl(meth)acrylate, caprolactone-modified hydroxy(meth)acrylate (for example, "PLACCEL (product name)" manufactured by Daicel Chemical Industries Ltd.), mono(meth)acrylates of polyester diol prepared from phthalic acid and propylene glycol, mono(meth)acrylates of polyester diol prepared from succinic acid and propylene glycol, polyethylene glycol mono(meth)acrylate, polypropylene glycol mono(meth)acrylate, pentaerythritol tri(meth)acrylate, 2-hydroxy-3-(meth)acryloyloxypropyl(meth)acrylate, and (meth)acrylate adducts of a variety of epoxy esters; carboxyl group-containing vinyl monomers such as (meth)acrylic acid, crotonic acid, itaconic acid, maleic acid, and fumaric acid; sulfonic acid group-containing vinyl monomers such as vinyl sulfonic acid, styrene sulfonic acid, and sulfoethyl(meth)acrylate; acidic phosphate ester-based vinyl monomers such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphate; and methylol group-containing vinyl monomers such as N-methylol(meth)acrylamide. It is either possible to use a single type of them alone, or a plurality of types of them in combination. Hydroxyl group-containing (meth)acrylate esters are particularly preferred as the monomer (c), when considering the reactivity with the isocyanate group of the polyfunctional isocyanate (b).

The amount of the polyfunctional acrylate (C), if used, is preferably from 1 to 85% by weight, and more preferably from 5 to 80% by weight, with respect to the total solid content of the curable resin composition of the present invention. By using the polyfunctional acrylate within such a range, the coating properties such as the hardness of the coating film to be formed, can be improved.

Regarding the light for use in the UV curing, it is possible to use, for example, a low pressure mercury lamp, a high pressure mercury lamp, a metal halide lamp, a xenon lamp, an argon laser, a helium cadmium laser, or the like. By using such a lamp, the coating film can be cured by irradiating UV light having a wavelength of about 180 to 400 nm onto the surface which has been coated with the UV curable resin composition. The amount of UV light to be irradiated is properly selected according to the type and the amount of the photopolymerization initiator to be used.

On the other hand, when the curable resin composition of the present invention is cured by heat, it is preferable to select each catalyst with the consideration of the temperature and the time for the reaction of the polymerizable double bond in the composition and for the urethanation reaction between the alcoholic hydroxyl group and the isocyanate.

Moreover, it is also possible to jointly use a heat-curable resin. The heat-curable resin can be exemplified by a vinyl-based resin, an unsaturated polyester resin, a polyurethane resin, an epoxy resin, an epoxy ester resin, an acrylic resin, a phenol resin, an oil resin, a ketone resin, a silicone resin, or a modified resin thereof, or the like.

Moreover, in order to adjust the viscosity at the time of the coating process, an organic solvent may also be contained. The organic solvent can be exemplified by: aliphatic or alicyclic hydrocarbons such as n-hexane, n-heptane, n-octane, cyclohexane, and cyclopentane; aromatic hydrocarbons such as toluene, xylene, and ethylbenzene; alcohols such as methanol, ethanol, n-butanol, ethylene glycol monomethyl ether, and propylene glycol monomethyl ether; esters such as ethyl acetate, butyl acetate, n-butyl acetate, n-amyl acetate, ethylene glycol monomethyl ether acetate, and propylene glycol monomethyl ether acetate; ketones such as acetone, methyl ethyl ketone, methyl isobutyl ketone, methyl n-amyl ketone, and cyclohexanone; polyalkylene glycol dialkyl ethers such as diethylene glycol dimethyl ether and diethylene glycol dibutyl ether; ethers such as 1,2-dimethoxyethane, tetrahydrofuran, and dioxane; and N-methylpyrrolidone, dimethylformamide, dimethylacetamide, or ethylene carbonate. It is either possible to use a single type of them alone, or a plurality of types of them in combination.

In addition, the curable resin composition of the present invention can use various types of additives such as an organic solvent, an inorganic pigment, an organic pigment, an extender pigment, clay minerals, wax, a surfactant, a stabilizer, a flow control agent, a dye stuff, a leveling agent, a rheology control agent, a UV absorber, an antioxidant, or a plasticizer, if necessary.

In the curable resin composition of the present invention, since the composite resin (A) has both the polysiloxane segment (a1) and the vinyl-based polymer segment (a2), it is relatively readily compatible with a silicone resin that can improve the surface lubricity or like property of the coating film, and also with an acrylic-based resin and a UV curable monomer. For this reason, highly compatible compositions can be obtained.

The curable resin composition of the present invention can be used in various forms. Specific examples of the form can include a solution in which the composition is dissolved in an organic solvent, a dispersion in which the composition is dispersed in an organic solvent, a dispersion in which the composition is dispersed in water, a solution containing the composition without a solvent, a powdery form, and the like.

The curable resin composition of the present invention can be directly used as a UV curable coating or other curable coatings. In addition, the above-mentioned additives such as an organic pigment and an inorganic pigment may also be added thereto.

The thickness of the coating film formed of the curable resin composition or coating of the present invention is not specifically limited, although preferred is 0.1 to 300 μm from the viewpoint of the capability of forming a cured coating film which excels in long term weather resistance outside and scratch resistance. When the thickness of the coating film is thinner than 0.1 μm, the weather resistance and the scratch resistance can not be given to the plastic material. When the thickness is thicker than 300 µm, the inside of the coating film can not be sufficiently irradiated with UV light, which may cause a failure in the hardening. Therefore, care should be taken.

After the curable resin composition of the present invention or the coating of the present invention, which contains a photopolymerization initiator or the like, as mentioned above, is coated onto a base material and irradiated with UV light, a coated article having a cured coating film with excellent weather resistance and excellent scratch resistance can be obtained.

Moreover, even without a photopolymerization initiator, it is also possible by irradiating a strong energy ray such as an electron beam, to obtain a cured coating film having equivalent coating film properties to those of the case where an initiator is used and UV light is irradiated.

Various kinds of materials can be used as the base material. For example, there can be employed a metal base material, an inorganic base material, a plastic base material, a paper, a wood-based base material, or the like.

There is no specific limitation in the process for laminating a layer made of the curable resin composition, for example, on the surface of a plastic base material. However, usually employed is a coating process. Specifically speaking, after the curable composition is coated onto the surface of the plastic base material and then irradiated with UV light, a laminated plastic having a cured coating film with excellent weather resistance and excellent scratch resistance can be obtained.

In this case, in order to control the rheology, it is preferable to appropriately dilute the curable resin composition by adding a solvent in addition to the above-mentioned additives. The solvent is not specifically limited, although it is preferable to avoid using toluene, xylene, and such aromatic hydrocarbons, with consideration of the work environment of the production at factories.

Moreover, the film thickness after coating is not specifically limited, although preferred is 0.1 to 300 µm from the viewpoint of the capability of forming a cured coating film having long term weather resistance outside and excellent scratch resistance. When the thickness of the cured coating film is thinner than 0.1 µm, the weather resistance and the scratch resistance can not be given to the plastic material. When the thickness is thicker than 300 µm, the inside of the coating film can not be sufficiently irradiated with UV light, which may cause a failure in the hardening. Therefore, care should be taken.

The plastic base material can be exemplified by: polyolefines such as polyethylene, polypropylene, and an ethylene-propylene copolymer; polyesters such as polyethylene isophthalate, polyethylene terephthalate, polyethylene naphthalate, and polybutylene terephthalate; polyamides such as nylon 1, nylon 11, nylon 6, nylon 66, and nylon MX-D; styrene-based polymers such as polystyrene, a styrene-butadiene block copolymer, a styrene-acrylonitrile copolymer, and a styrene-butadiene-acrylonitrile copolymer (ABS resin); acrylic-based polymers such as polymethyl methacrylate, and a methyl methacrylate/ethyl acrylate copolymer; polycarbonate; or the like. The plastic base material may be in a monolayer structure or a laminated structure having two or more layers. Moreover, these plastic base materials may be unstretched, uniaxially stretched, or biaxially stretched, In addition, the plastic base material may also contain a known antistatic agent, antifog agent, antiblocking agent, UV absorber, antioxidant, photostabilizer, crystal nucleating agent, lubricant, or such a known additive, if necessary, to an extent that will not impair the effect of the present invention.

A known surface treatment may be applied to the surface of the plastic base material so as to much improve the adhesion to the curable resin composition of the present invention. Such a surface treatment can be exemplified by a corona discharge treatment, a plasma treatment, a flame plasma treatment, an electron beam treatment, and a UV treatment. It is either possible to conduct only one of these treatments alone, or a plural number of these treatments in combination.

The shape of the base material is not specifically limited. For example, it may be in a sheet-like shape, a plate-like shape, a globular shape, a film-like shape, a large-sized construction, a complex-shaped assembly, or a molded product. In addition, the surface of the base material may also be previously coated with an undercoating or the like. Even if the coated part were deteriorated, the curable resin composition of the present invention can be overcoated thereon.

Regarding the undercoating, there can be employed known water-soluble or water-dispersible coatings, organic solvent-based or organic solvent-dispersible coatings, powdery coatings, and the like. Various types can be used, specific examples of which can include an acrylic resin-based coating, a polyester resin-based coating, an alkyd resin-based coating, an epoxy resin-based coating, a fatty acid-modified epoxy resin-based coating, a silicone resin-based coating, a polyurethane resin-based coating, a fluoroolefin-based coating, or an amine-modified epoxy resin coating. In addition, the undercoating may be a clear coating without a pigment, an enamel-based coating containing a pigment as mentioned above, or a metallic coating containing aluminium flakes.

Regarding the method for coating the curable resin compositions or the coatings of the present invention to the base material, known and common application methods, such as brush coating, roller coating, spray coating, dip coating, flow coater coating, roll coater coating, or electrodeposition coating, can be employed.

After the curable resin composition of the present invention is coated on the surface of the base material by the above-mentioned application method, the coated surface is irradiated with UV light by the above-mentioned method. By so doing, a coated article having both long term weather resistance outside and excellent scratch resistance, as well as having a cured coating film which excels in adhesion to a plastic material can be obtained.

EXAMPLES

Next is a specific description of the present invention with reference to Examples and Comparative Examples. In these Examples, the "part" and the "%" are on the weight basis unless otherwise stated.

Synthesis Example 1

Preparation Example of Polysiloxane

In a reactor vessel equipped with a stirrer, a thermometer, an addition funnel, a cooling tube, and a nitrogen inlet, 415 parts of methyltrimethoxysilane (MTMS) and 756 parts of 3-methacryloyloxypropyltrimethoxysilane (MPTS) were charged and heated to 60° C. with stirring under a nitrogen gas flow. Next, a mixture consisting of 0.1 parts of the "A-3" (isopropyl acid phosphate manufactured by Sakai Chemical Industry Co., Ltd.) and 121 parts of deionized water was added dropwise over 5 minutes. After the dropwise addition, the inside of the reactor vessel was heated to 80° C. and stirred for 4 hours to thereby effect a hydrolysis and condensation reaction. By so doing, a reaction product was produced.

Methanol and water were removed from the produced reaction product under reduced pressure of 1 to 30 kilopascals (kPa) at 40 to 60° C., to thereby produce 1000 parts of a polysiloxane (a1-1) having a number average molecular weight of 1000 in which the active ingredient accounted for 75.0%.

Here, the term "active ingredient" refers to a value obtained by a division of the theoretical yield (parts by weight) when assuming that all methoxy groups in the used silane monomers were subjected to the hydrolysis and condensation reaction, by the actual yield (parts by weight) after the hydrolysis and condensation reaction. That is, it is a value obtained by the equation: (Theoretical yield (parts by weight) assuming that all methoxy groups in silane monomers were hydrolyzed and condensed/Actual yield (parts by weight) after the hydrolysis and condensation reaction).

Synthesis Example 2

Same as Above

In a reactor vessel similar to the vessel of Synthesis Example 1, 442 parts of MTMS and 760 parts of 3-acryloyloxypropyltrimethoxysilane (APTS) were charged and heated to 60° C. with stirring under a nitrogen gas flow. Next, a mixture consisting of 0.1 parts of the "A-3" and 129 parts of deionized water was added dropwise over 5 minutes. After the dropwise addition, the inside of the reactor vessel was heated to 80° C. and stirred for 4 hours to thereby effect a hydrolysis and condensation reaction. By so doing, a reaction product was produced. Methanol and water were removed from the produced reaction product under reduced pressure of 1 to 30 kilopascals (kPa) at 40 to 60° C., to thereby produce 1000 parts of a polysiloxane (a1-2) having a number average molecular weight of 1000 in which the active ingredient accounted for 75.0%.

Synthesis Example 3

Preparation Example of Composite Resin (A)

In a reactor vessel similar to the vessel of Synthesis Example 1, 20.1 parts of phenyltrimethoxysilane (PTMS), 24.4 parts of dimethyldimethoxysilane (DMDMS), and 107.7 parts of n-butyl acetate were charged and heated to 80° C. with stirring under a nitrogen gas flow. Next, a mixture containing 15 parts of methyl methacrylate (MMA), 45 parts of n-butyl methacrylate (BMA), 39 parts of 2-ethylhexyl methacrylate (EHMA), 1.5 parts of acrylic acid (AA), 4.5 parts of MPTS, 45 parts of 2-hydroxyethyl methacrylate (HEMA), 15 parts of n-butyl acetate, and 15 parts of tert-butylperoxy-2-ethylhexanoate (TBPEH) was added dropwise into the reactor vessel at the same temperature over 4 hours with stirring under a nitrogen gas flow. The resultant product was further stirred at the same temperature for 2 hours. Then, a mixture consisting of 0.05 parts of the "A-3" and 12.8 parts of deionized water was added dropwise into the reactor vessel over 5 minutes, and stirred at the same temperature for 4 hours to thereby promote a hydrolysis and condensation reaction on PTMS, DMDMS, and MPTS. The reaction product was analyzed with $^1$H-NMR, showing that almost 100% of trimethoxysilyl groups held by the silane monomers in the reactor vessel were hydrolyzed. Next, the product was stirred at the same temperature for 10 hours to thereby produce a reaction product in which the residual amount of TBPEH accounted for 0.1% or lower. The residual amount of TBPEH was measured by iodometric titration.

Next, in the reactor vessel, 162.5 parts of the polysiloxane (a1-1) produced by Synthesis Example 1 was added and stirred for 5 minutes, which was then added with 27.5 parts of deionized water and stirred at 80° C. for 4 hours to thereby effect a hydrolysis and condensation reaction on the reaction product and the polysiloxane. Generated methanol and water were removed from the produced reaction product under reduced pressure of 10 to 300 kPa at 40 to 60° C. for 2 hours. Next, 150 parts of methyl ethyl ketone (MEK) and 27.3 parts of n-butyl acetate were added, to thereby produce 600 parts of a composite resin (A-1) including a vinyl polymer segment and a polysiloxane segment in which non-volatile components accounted for 50.0%.

Synthesis Example 4

Same as Above

In a reactor vessel similar to the vessel of Synthesis Example 1, 20.1 parts of PTMS, 24.4 parts of DMDMS, and 107.7 parts of n-butyl acetate were charged and heated to 80° C. with stirring under a nitrogen gas flow. Next, a mixture containing 15 parts of MMA, 45 parts of BMA, 39 parts of EHMA, 1.5 parts of AA, 4.5 parts of MPTS, 45 parts of HEMA, 15 parts of n-butyl acetate, and 15 parts of TBPEH was added dropwise into the reactor vessel at the same temperature over 4 hours with stirring under a nitrogen gas flow. The resultant product was further stirred at the same temperature for 2 hours. Then, a mixture consisting of 0.05 parts of the "A-3" and 12.8 parts of deionized water was added dropwise into the reactor vessel over 5 minutes, and stirred at the same temperature for 4 hours to thereby promote a hydrolysis and condensation reaction on PTMS, DMDMS, and MPTS. The reaction product was analyzed with $^1$H-NMR, showing that almost 100% of trimethoxysilyl groups held by the silane monomers in the reactor vessel were hydrolyzed. Next, the product was stirred at the same temperature for 10 hours to thereby produce a reaction product in which the residual amount of TBPEH accounted for 0.1% or lower. The residual amount of TBPEH was measured by iodometric titration.

Next, in the reactor vessel, 562.5 parts the polysiloxane (a1-1) produced by Synthesis Example 1 was added and stirred for 5 minutes, which was then added with 80.0 parts of deionized water and stirred at 80° C. for 4 hours to thereby effect a hydrolysis and condensation reaction on the reaction product and the polysiloxane. Generated methanol and water were removed from the produced reaction product under reduced pressure of 10 to 300 kPa at 40 to 60° C. for 2 hours. Next, 128.6 parts of MEK and 5.8 parts of n-butyl acetate were added, to thereby produce 857 parts of a composite resin (A-2) including a vinyl polymer segment and a polysiloxane segment in which non-volatile components accounted for 70.0%.

Synthesis Example 5

Same as Above

In a reactor vessel similar to the vessel of Synthesis Example 1, 20.1 parts of PTMS, 24.4 parts of DMDMS, and 107.7 parts of n-butyl acetate were charged and heated to 80° C. with stirring under a nitrogen gas flow. Next, a mixture containing 15 parts of MMA, 45 parts of BMA, 39 parts of EHMA, 1.5 parts of AA, 4.5 parts of MPTS, 45 parts of HEMA, 15 parts of n-butyl acetate, and 15 parts of TBPEH was added dropwise into the reactor vessel at the same temperature over 4 hours with stirring under a nitrogen gas flow. The resultant product was further stirred at the same temperature for 2 hours. Then, a mixture consisting of 0.05 parts of the "A-3" and 12.8 parts of deionized water was added dropwise into the reactor vessel over 5 minutes, and stirred at the same temperature for 4 hours to thereby promote a hydrolysis and condensation reaction on PTMS, DMDMS, and MPTS. The reaction product was analyzed with $^1$H-NMR, showing that almost 100% of trimethoxysilyl groups held by the silane monomers in the reactor vessel were hydrolyzed. Next, the product was stirred at the same temperature for 10 hours to thereby produce a reaction product in which the residual amount of TBPEH accounted for 0.1% or lower. The residual amount of TBPEH was measured by iodometric titration.

Next, in the reactor vessel, 162.5 parts of the polysiloxane (a1-2) produced by Synthesis Example 2 was added and stirred for 5 minutes, which was then added with 27.5 parts of deionized water and stirred at 80° C. for 4 hours to thereby effect a hydrolysis and condensation reaction on the reaction product and the polysiloxane. Generated methanol and water were removed from the produced reaction product under reduced pressure of 10 to 300 kPa at 40 to 60° C. for 2 hours. Next, 150 parts of MEK and 27.3 parts of n-butyl acetate were added, to thereby produce 600 parts of a composite resin (A-3) including a vinyl polymer segment and a polysiloxane segment in which non-volatile components accounted for 50.0%.

Synthesis Example 6

Same as Above

In a reactor vessel similar to the vessel of Synthesis Example 1, 17.6 parts of PTMS, 21.3 parts of DMDMS, and 129.0 parts of n-butyl acetate were charged and heated to 80° C. with stirring under a nitrogen gas flow. Next, a mixture containing 21 parts of MMA, 63 parts of BMA, 54.6 parts of EHMA, 2.1 parts of AA, 6.3 parts of MPTS, 63 parts of HEMA, 21 parts of n-butyl acetate, and 21 parts of TBPEH was added dropwise into the reactor vessel at the same temperature over 4 hours with stirring under a nitrogen gas flow. The resultant product was further stirred at the same temperature for 2 hours. Then, a mixture consisting of 0.04 parts of the "A-3" and 11.2 parts of deionized water was added dropwise into the reactor vessel over 5 minutes, and stirred at the same temperature for 4 hours to thereby promote a hydrolysis and condensation reaction on PTMS, DMDMS, and MPTS. The reaction product was analyzed with $^1$H-NMR, showing that almost 100% of trimethoxysilyl groups held by the silane monomers in the reactor vessel were hydrolyzed. Next, the product was stirred at the same temperature for 10 hours to thereby produce a reaction product in which the residual amount of TBPEH accounted for 0.1% or lower. The residual amount of TBPEH was measured by iodometric titration.

Next, in the reactor vessel, 87.3 parts of the polysiloxane (a1-1) produced by Synthesis Example 1 was added and stirred for 5 minutes, which was then added with 12.6 parts of deionized water and stirred at 80° C. for 4 hours to thereby effect a hydrolysis and condensation reaction on the reaction product and the polysiloxane. Generated methanol and water were removed from the produced reaction product under reduced pressure of 10 to 300 kPa at 40 to 60° C. for 2 hours. Next, 150 parts of MEK was added, to thereby produce 600 parts of a composite resin (A-4) including a vinyl polymer segment and a polysiloxane segment in which non-volatile components accounted for 50.0%.

Synthesis Example 7

Same as Above

In a reactor vessel similar to the vessel of Synthesis Example 1, 20.1 parts of PTMS, 24.4 parts of DMDMS, and 135.0 parts of n-butyl acetate were charged and heated to 80° C. with stirring under a nitrogen gas flow. Next, a mixture containing 15 parts of MMA, 45 parts of BMA, 39 parts of EHMA, 1.5 parts of AA, 4.5 parts of MPTS, 45 parts of HEMA, 15 parts of n-butyl acetate, and 15 parts of TBPEH was added dropwise into the reactor vessel at the same temperature over 4 hours with stirring under a nitrogen gas flow. The resultant product was further stirred at the same temperature for 2 hours. Then, a mixture consisting of 0.05 parts of the "A-3" and 12.8 parts of deionized water was added dropwise into the reactor vessel over 5 minutes, and stirred at the same temperature for 4 hours to thereby promote a hydrolysis and condensation reaction on PTMS, DMDMS, and MPTS. The reaction product was analyzed with $^1$H-NMR, showing that almost 100% of trimethoxysilyl groups held by the silane monomers in the reactor vessel were hydrolyzed. Next, the product was stirred at the same temperature for 10 hours to thereby produce a reaction product in which the residual amount of TBPEH accounted for 0.1% or lower. The residual amount of TBPEH was measured by iodometric titration.

Next, in the reactor vessel, a mixture containing 122.2 parts of the "X-40-9265A" (a partial hydrolysis and condensation product of MTMS manufactured by Shin-Etsu Chemical Co. Ltd. in which the active ingredient was 70%) and 50.3 parts of MPTS was added and stirred for 5 minutes, which was then added with 44.2 parts of deionized water and stirred at 80° C. for 4 hours to thereby effect a hydrolysis and condensation reaction on the reaction product and the polysiloxane. Generated methanol and water were removed from the produced reaction product under reduced pressure of 10 to 300 kPa at 40 to 60° C. for 2 hours. Next, 150 parts of MEK was added, to thereby produce 600 parts of a composite resin (A-5) including a vinyl polymer segment and a polysiloxane segment in which non-volatile components accounted for 50.0%.

Comparative Synthesis Example 1

Preparation of Control Composite Resin (R-1)

In a reactor vessel similar to the vessel of Synthesis Example 1, 250 parts of xylene and 250 parts of n-butyl acetate were charged and heated to 80° C. with stirring under a nitrogen gas flow. Next, a mixture consisting of 500 parts of styrene, 123 parts of BMA, 114 parts of BA, 3 parts of AA, 230 parts of HEMA, 30 parts of MPTS, 178 parts of xylene, 178 parts of n-butyl acetate, and 50 parts of TBPEH was added dropwise into the reactor vessel at the same temperature over 4 hours with stirring under a nitrogen gas flow. Then, the resultant product was stirred at the same temperature for 16 hours, to thereby prepare an acrylic polymer having a trimethoxysilyl group.

Next, in a reactor vessel similar to the vessel of Synthesis Example 1, 509 parts of methyltriethoxysilane (MTES), 389 parts of MTMS, 71 parts of PTMS, 129 parts of DMDMS, 298 parts of xylene, and 296 parts of n-butyl acetate were charged and heated to 80° C. with stirring under a nitrogen gas flow. Next, a mixture consisting of 0.03 parts of the "A-3" and 347 parts of deionized water was added dropwise into the reactor vessel at the same temperature over 5 minutes, and stirred at the same temperature for 4 hours, to thereby yield a reaction product. The reaction product was analyzed with $^1$H-NMR, showing that the hydrolysis of MTES, MTMS, PTMS, and DMDMS was advanced.

Then, 905 parts of the acrylic polymer was added into the reactor vessel and stirred at the same temperature for 4 hours to thereby yield the reaction product. Next, generated methanol and water were removed from the produced reaction product under reduced pressure of 10 to 300 kPa at 40 to 60° C. for 2 hours to thereby produce 1000 parts of a control composite resin (R-1) in which non-volatile components accounted for 50.0%. This Synthesis Example follows Reference Example 23 described in the Examples of Patent Document 1.

Comparative Synthesis Example 2

Preparation of Control Composite Resin (R-2)

In a reactor vessel similar to the vessel of Synthesis Example 1, 191 parts of PTMS were charged and heated to 120° C. with stirring under a nitrogen gas flow. Next, a mixture consisting of 169 parts of MMA, 11 parts of MPTS, and 18 parts of TBPEH was added dropwise into the reactor vessel at the same temperature over 4 hours with stirring under a nitrogen gas flow. Then, the resultant product was stirred at the same temperature for 16 hours, to thereby prepare an acrylic polymer having a trimethoxysilyl group.

Next, the temperature of the reactor vessel was adjusted at 80° C., and 131 parts of MTMS, 226 parts of APTS, and 116 parts of DMDMS were added into the reactor vessel with stirring. Then, a mixture consisting of 6.3 parts of the "A-3" and 97 parts of deionized water was added dropwise into the reactor vessel over 5 minutes, and stirred at the same temperature for 2 hours, to thereby effect a hydrolysis and condensation reaction. By so doing, a reaction product was produced. The reaction product was analyzed with $^1$H-NMR, showing that almost 100% of trimethoxysilyl groups held by the acrylic polymers were hydrolyzed. Generated methanol and water were removed from the produced reaction product under reduced pressure of 10 to 300 kPa at 40 to 60° C. for 2 hours. Next, 400 parts of n-butyl acetate was added, to thereby produce 600 parts of a control composite resin (R-2) including an acrylic polymer segment and a polysiloxane segment in which non-volatile components accounted for 60.0%. This Synthesis Example follows Synthesis Example 1 described in the Examples of Patent Document 2.

Example 1

40.0 parts of the composite resin (A-1) produced by Synthesis Example 1, 0.8 parts of Irgacure 184 (a photopolymerization initiator manufactured by Ciba Specialty Chemicals), and 4.2 parts of DN-901S (a polyisocyanate manufactured by DIC Corporation) were mixed to thereby produce a clear coating (Coating-1).

Examples 2 to 8 and Comparative Examples 1 to 4

In the same manner as that of Example 1, clear coatings (Coating-2) to (Coating-8) and comparative clear coatings (Comparative coating-1) to (Comparative coating-4) were respectively prepared based on the blending ratios shown in Table 1.

(Evaluation for Coatings)

The clear coatings (Coating-1) to (Coating-8) and the comparative clear coatings (Comparative coating-1) to (Comparative coating-4) prepared by Examples 1 to 8 and Comparative Examples 1 to 4 were evaluated as follows. That is, evaluation-purpose cured coating films X or Y were used for the evaluation of the "crack resistance", the "glossiness retention rate, the "anti-wet adhesion", and the "steel wool resistance", which serve as indexes to indicate the weather resistance of cured coating films.

(Evaluation-Purpose Cured Coating Film X)

A chromate-treated aluminum steel plate having a size of 150 mm×70 mm×2 mm was coated with a white acrylic urethane coating in which the pigment weight concentration (PWC) was 60%, so that the dry thickness would be from 30 to 40 μm. This was cured by heating at 80° C. for 30 minutes, and respectively coated with clear coatings prepared by the Examples and Comparative Examples, so that the dry thickness would be 20 μm. These were dried at 80° C. for 5 minutes, and irradiated with UV light at a dose of about 1000 mJ under a high pressure mercury lamp of 80 W/cm$^2$. Then, they were left at room temperature for a week. By so doing, the cured coating films X were prepared.

(Evaluation-Purpose Cured Coating Film Y)

The clear coatings prepared by the Examples and Comparative Examples were respectively coated on a base material of polyethylene terephthalate (PET) having a size of 150 mm×70 mm×3 mm, so that the dry thickness would be 20 μm. These were dried at 80° C. for 5 minutes, and irradiated with UV light at a dose of about 1000 mJ under a high pressure mercury lamp of 80 W/cm$^2$. Then, they were left at room temperature for a week. By so doing, the cured coating films Y were prepared.

Since the Comparative coating-1 is not UV curable, the cured coating film was prepared in the same manner except that the UV irradiation was not performed.

Crack Resistance

The evaluation-purpose cured coating films X were subjected to an accelerated weather resistance test with a sunshine weather-o-meter. The condition of non-exposed cured coating films and the condition of cured coating films after a 3000 hour exposure were compared by eye. The judgement criteria were such that: (Excellent) indicates those showing no change in the condition of the coating film; (Good) indicates those showing cracks in some parts; and (Poor) indicates those showing cracks all over the surface.

Glossiness Retention Rate

The evaluation-purpose cured coating films X were subjected to an accelerated weather resistance test with a sunshine weather-o-meter. The mirror reflectivity (%) at 60 degrees of the cured coating film after a 3000 hour exposure was divided by the mirror reflectivity (%) at 60 degrees of the non-exposed cured coating film, and the obtained value was multiplied by 100. This was expressed as the glossiness retention rate (%). A glossiness retention rate closer to 100% means better weather resistance.

Anti-Wet Adhesion

The evaluation-purpose cured coating films Y were held in a constant temperature at 50° C. and a constant humidity at 95% for 500 hours, and then left at room temperature for 24 hours. Next, the adhesion of the coating film to the base material was evaluated by the JIS K5600 cross-cut test with 100 square pieces in a size of 1 mm×1 mm. The adhesion was represented by the number of remaining pieces, out of 100 pieces, after a cellophane tape had been once adhered and then peeled off.

Steel Wool Resistance

The surface of the evaluation-purpose cured coating film Y was ground with #0000 steel wool under a load of 500 g. The difference ΔH (%) of the haze value between before and after grinding was measured. A smaller difference means a lower damageability.

The respective compositions and the evaluation results are shown in Table 1 and Table 2.

TABLE 1

|  |  | Example 1 | Example 2 | Example 3 | Example 4 | Example 5 | Example 6 | Example 7 | Example 8 |
|---|---|---|---|---|---|---|---|---|---|
| Composite resin | (A-1) | 40 | 40 |  |  |  |  |  |  |
|  | (A-2) |  |  | 28.6 |  | 21.4 |  |  | 21.4 |
|  | (A-3) |  |  |  | 10 |  |  |  |  |
|  | (A-4) |  |  |  |  |  | 40 |  |  |
|  | (A-5) |  |  |  |  |  |  | 40 |  |
| Control resin | (R-1) |  |  |  |  |  |  |  |  |
|  | (R-2) |  |  |  |  |  |  |  |  |
| Content (%) of (a1) in composite resin *3 |  | 50 | 50 | 75 | 50 | 75 | 30 | 50 | 75 |
| Content (%) of double bond in (a1) |  | 13.5 | 13.5 | 15.7 | 9.6 | 15.7 | 12.1 | 5.5 | 15.7 |
| Content (%) of (a1) *1 |  | 40 | 24 | 40 | 12 | 57.2 | 14.8 | 28.8 | 19.3 |
| Polyisocyanate | DN-901S | 4.2 |  |  | 1.1 | 2.2 | 9.4 | 6.7 |  |
|  | DN-950 |  | 17.3 | 5.2 |  |  |  |  |  |
|  | DN-955 |  |  |  |  |  |  |  | 36.1 |
| Content (%) of (B) *2 |  | 17 | 31 | 10 | 5 | 11.2 | 23.2 | 19.2 | 46.5 |
| Polyfunctional acrylate | PETA |  | 8 |  |  | 1.8 | 10 | 7 | 15 |
|  | DPHA |  |  | 12.4 |  |  |  |  |  |
|  | V4018 |  |  |  | 17.5 |  |  |  |  |
| Photo-polymerization initiator | I-184 | 0.80 | 1.10 | 1.30 | 0.40 | 0.67 | 1.20 | 1.08 | 1.20 |
|  | I-127 |  |  |  | 0.40 |  |  |  |  |
| Coating name |  | Coating-1 | Coating-2 | Coating-3 | Coating-4 | Coating-5 | Coating-6 | Coating-7 | Coating-8 |
| Evaluation of coating film | Crack resistance | Excellent | Excellent | Excellent | Excellent | Excellent | Excellent | Excellent | Excellent |
|  | Glossiness retention rate | 97 | 95 | 98 | 94 | 96 | 93 | 95 | 95 |
|  | Anti-wet adhesion | 100 | 100 | 100 | 100 | 90 | 100 | 100 | 100 |
|  | Steel wool resistance | 8.4 | 0.9 | 0.8 | 0.2 | 3.2 | 1.5 | 4.2 | 5.1 |

TABLE 2

|  |  | Comparative Example 1 | Comparative Example 2 | Comparative Example 3 | Comparative Example 4 |
|---|---|---|---|---|---|
| Composite resin | (A-1) |  |  |  |  |
|  | (A-2) |  |  |  | 28.6 |
|  | (A-3) |  |  |  |  |
|  | (A-4) |  |  |  |  |
|  | (A-5) |  |  |  |  |
| Control resin | (R-1) | 40 |  |  |  |
|  | (R-2) |  | 30 | 40 |  |
| Content (%) of (a1) in composite resin *3 |  | 50 | 70 | 70 | 75 |
| Content (%) of double bond in (a1) |  | 0 | 0 | 0 | 15.7 |
| Content (%) of (a1) *1 |  | 38 | 67 | 40 | 66 |
| Polyisocyanate | DN-901S | 6.5 |  | 0.8 | 2.1 |
|  | DN-950 |  |  |  |  |
|  | DN-955 |  |  |  |  |
| Content (%) of (B) *2 |  | 25 | 0 | 3 | 9.1 |

TABLE 2-continued

|  |  | Comparative Example 1 | Comparative Example 2 | Comparative Example 3 | Comparative Example 4 |
|---|---|---|---|---|---|
| Polyfunctional acrylate | PETA |  |  | 3.2 |  |
|  | DPHA |  |  |  |  |
|  | V4018 |  |  |  |  |
| Photopolymerization initiator | I-184 |  | 1.20 | 0.93 | 0.80 |
|  | I-127 |  |  |  |  |
| Coating name |  | Comparative coating-1 | Comparative coating-2 | Comparative coating-3 | Comparative coating-4 |
| Evaluation of coating film | Crack resistance | Excellent | Poor | Poor | Excellent |
|  | Glossiness retention rate | 95 | 67 | 70 | 89 |
|  | Anti-wet adhesion | 100 | 0 | 100 | 0 |
|  | Steel wool resistance | 35 | 7.1 | 2.7 | 7.9 |

Abbreviations in Table 1 and Table 2
(a1): Abbreviation of the polysiloxane segment (a1)
*1: Content (%) of the polysiloxane segment (a1) with respect to the total solid content of the curable resin composition
*2: Content (%) of the polyisocyanate (B) with respect to the total solid content of the curable resin composition
*3: Content of the polysiloxane segment (a1) with respect to the total solid content of the composite resin (A)
DN-901S: BURNOCK DN-901S (a polyisocyanate manufactured by DIC Corporation)
DN-950: BURNOCK DN-950 (a polyisocyanate manufactured by DIC Corporation)
DN-955: BURNOCK DN-955 (a polyisocyanate manufactured by DIC Corporation)
PETA: Pentaerythritol triacrylate
DPHA: Dipentaerythritol hexaacrylate
V-4018: UNIDIC V-4018 (a urethane acrylate manufactured by DIC Corporation)
I-184: Irgacure 184
I-127: Irgacure 127

As a result, all of the clear coatings (Coating-1) to (Coating-8) evaluated in Examples 1 to 8 showed no cracks after 3000 hours and excellent glossiness retention rates, and coating films having excellent weather resistance were given.

The clear coating (Comparative coating-1) evaluated in Comparative Example 1 is an example in which the resin (R-1) and the isocyanate were reacted at normal temperature. It was inferior in steel wool resistance.

The clear coating (Comparative coating-2) evaluated in Comparative Example 2 is an example in which no polyisocyanate was used. It was inferior in weather resistance and adhesion.

The clear coating (Comparative coating-3) evaluated in Comparative Example 3 is an example in which too little polyisocyanate was used. It was inferior in weather resistance.

The clear coating (Comparative coating-4) evaluated in Comparative Example 4 is an example in which too much polysiloxane segment was used. It was inferior in anti-adhesion.

(Evaluation of Laminated Plastics)

Example 9

40.0 parts of the composite resin (A-1) produced by Synthesis Example 1, 7.0 parts of pentaerythritol triacrylate (PETA), 1.08 parts of Irgacure 184 (a photopolymerization initiator manufactured by Ciba Japan K.K.), 0.67 parts of TINUVIN 400 (a hydroxyphenyltriazine-based UV absorber manufactured by Ciba Japan K.K.), 0.34 parts of TINUVIN 123 (a hindered amine-based light stabilizer (HALS) manufactured by Ciba Japan K.K.), and 6.7 parts of BURNOCK DN-901S (a polyisocyanate manufactured by DIC Corporation) were mixed to thereby produce a clear coating (Coating-9).

The clear coating (Coating-9) produced by Example 9 was coated over a Cosmoshine A4300 film (a PET film manufactured by Toyobo Co., Ltd.) having a size of 100 mm×100 mm×0.125 mm, so that the dry thickness would be 20 μm. This was dried at 80° C. for 5 minutes, and then was irradiated with UV light at a dose of about 1000 mJ under a high pressure mercury lamp of 80 W/cm². This was left at room temperature for a week. By so doing, the evaluation-purpose laminated plastic (plastic film laminate) of interest was prepared.

Examples 10 to 16 and Comparative Examples 5 to 8

In the same manner as that of Example 9, clear coatings (Coating-10) to (Coating-16) were prepared based on the blending examples shown in Table 3, and comparative clear coatings (Comparative coating-5) to (Comparative coating-8) were prepared based on the blending examples shown in Table 4. These coatings were applied on a variety of base materials shown in the respective tables so that the dry thickness would be 20 μm. These were dried at 80° C. for 5 minutes, and irradiated with UV light at a dose of about 1000 mJ under a high pressure mercury lamp of 80 W/cm². Then, they were left at room temperature for a week. By so doing, the evaluation-purpose laminated plastics of interest were prepared.

Since the Comparative coating-5 is not UV curable, the evaluation-purpose laminated plastic of interest was prepared in the same manner except that the UV irradiation was not performed.

(Evaluation)

The laminated plastics prepared by Examples 9 to 16 and Comparative Examples 5 to 8 were evaluated as follows. Here, the evaluation was made mainly on the "crack resistance", the "haze value", the "anti-wet adhesion", and the "abrasion resistance", which serve as indices of plastic films.

Crack Resistance

The evaluation-purpose laminated plastics were subjected to an accelerated weather resistance test with a sunshine weather-o-meter. Non-exposed laminated plastics and laminated plastics after a 3000 hour exposure were compared by eye. The judgement criteria were such that: (Excellent) indicates those showing no change in the condition of the surface and other parts; (Good) indicates those showing cracks in some parts; and (Poor) indicates those showing cracks all over the surface.

Haze Value

The degree of deterioration of the laminated plastics due to an accelerated weather resistance test with a sunshine weather-o-meter was converted into a numerical term by the haze value. Normally, the haze value is obtained by a measurement of the light transmission of a test piece with use of a haze mater, and a calculation with the following equation (the unit is N.

$$Th = Td/Tt \text{ (}Td\text{ means scattered light transmission and } Tt \text{ means total light transmission.)} \quad \text{[Equation 1]}$$

Here, the difference between the haze value (%) of a laminated plastic after a 3000 hour exposure and the haze value (%) of a non-exposed laminated plastic was expressed as the change in the haze value ΔH (%). A greater difference means more advanced deterioration of the laminated plastic.

Anti-Wet Adhesion

The evaluation-purpose laminated plastics were held in a constant temperature at 85° C. and a constant humidity at 80% for 3000 hours, and then left at room temperature for 24 hours. Next, the adhesion between the cured coating film and the base material, which constituted the laminated plastic, was evaluated by the HS K5600 cross-cut test with 100 square pieces in a size of 1 mm×1 mm. The adhesion was represented by the number of remaining pieces, out of 100 pieces, after a cellophane tape had been once adhered and then peeled off.

Abrasion Resistance

The surface of the cured coating film of the evaluation-purpose laminated plastics was ground by a method in accordance with the Taber abrasion test JIS R3212 (abrasion wheel: SC-10F, load: 500 g, and number of revolutions: 500). The difference of the haze value between before and after grinding, that is the change in the haze value ΔH (%), was measured. A smaller difference means a higher abrasion resistance.

The composition ratios of Examples 9 to 16 and Comparative Examples 5 to 8 and the evaluation results of the laminated plastics are shown in Table 3 and Table 4.

TABLE 3

| | | Example 9 | Example 10 | Example 11 | Example 12 | Example 13 | Example 14 | Example 15 | Example 16 |
|---|---|---|---|---|---|---|---|---|---|
| Composite resin | (A-1) | 40 | | | | | | | |
| | (A-2) | | 21.4 | 7.1 | | 21.4 | | | 21.4 |
| | (A-3) | | | | 10 | | | | |
| | (A-4) | | | | | | 40 | | |
| | (A-5) | | | | | | | 40 | |
| Control resin | (R-1) | | | | | | | | |
| | (R-2) | | | | | | | | |
| Content (%) of (a1) in composite resin *3 | | 50 | 75 | 75 | 50 | 75 | 30 | 50 | 75 |
| Content (%) of double bond in (a1) | | 13.5 | 15.7 | 15.7 | 9.6 | 15.7 | 12.1 | 5.5 | 15.7 |
| Content (%) of (a1) *1 | | 28 | 46.9 | 13.9 | 12.1 | 55.5 | 14.3 | 28 | 18.8 |
| Polyisocyanate | DN-901S | 6.7 | 3.1 | | 1 | 2.2 | 9.4 | 6.7 | |
| | DN-950 | | | 5.4 | | | | | |
| | DN-955 | | | | | | | | 36.1 |
| Content (%) of (B) *2 | | 18.7 | 13.1 | 16 | 5 | 10.9 | 22.6 | 18.7 | 45.1 |
| Polyfunctional acrylate | PETA | 7 | 4.4 | 5 | | 1.8 | 10 | 7 | 15 |
| | DPHA | | | | | | | | |
| | V4018 | | | 13.5 | | | | | |
| | 17-813 | | | | 16.9 | | | | |
| Photopolymerization initiator | I-184 | 1.08 | 0.78 | 0.84 | 0.37 | 0.67 | 1.20 | 1.08 | 1.20 |
| | I-127 | | | | 0.37 | | | | |
| UV absorber | TINUVIN 384 | | 0.45 | | | | | | |
| | TINUVIN 400 | 0.67 | | 0.51 | | 0.38 | 0.79 | 0.67 | 1.14 |
| | TINUVIN 479 | | | | 0.20 | | | | |
| Light stabilizer (HALS) | TINUVIN 123 | 0.34 | 0.23 | 0.25 | | 0.19 | 0.39 | 0.34 | 0.57 |
| | TINUVIN 152 | | | | 0.2 | | | | |
| Coating name | | Coating-9 | Coating-10 | Coating-11 | Coating-12 | Coating-13 | Coating-14 | Coating-15 | Coating-16 |
| Base material | PET | A4300 | | | | | A4300 | A4300 | A4300 |
| | PEN | | | | Q51DW | | | | |
| | PC | | LS2 | LS2 | | LS2 | | | |
| Evaluation of coating film | Crack resistance | Excellent | Excellent | Excellent | Excellent | Excellent | Excellent | Excellent | Excellent |
| | Change in haze value | 1.1 | 0.5 | 0.9 | 1.8 | 0.6 | 0.8 | 0.7 | 0.9 |
| | Anti-wet adhesion | 100 | 100 | 100 | 100 | 90 | 100 | 100 | 100 |
| | Abrasion resistance | 9.8 | 7.9 | 4.3 | 2.2 | 8.9 | 7.7 | 11.2 | 12.7 |

TABLE 4

| | | Comparative Example 5 | Comparative Example 6 | Comparative Example 7 | Comparative Example 8 |
|---|---|---|---|---|---|
| Composite resin | (A-1) | | | | |
| | (A-2) | | | | 28.6 |
| | (A-3) | | | | |
| | (A-4) | | | | |
| | (A-5) | | | | |
| Control resin | (R-1) | 40 | | | |
| | (R-2) | | 30 | 40 | |
| Content (%) of (a1) in composite resin *3 | | 50 | 70 | 70 | 75 |
| Content (%) of double bond in (a1) | | 0 | 0 | 0 | 15.7 |
| Content (%) of (a1) *1 | | 36.6 | 65.4 | 38.9 | 63.7 |
| Polyisocyanate | DN-901S | 6.5 | | 0.8 | 2.1 |
| | DN-950 | | | | |
| | DN-955 | | | | |
| Content (%) of (B) *2 | | 25 | 0 | 3 | 9.1 |
| Polyfunctional acrylate | PETA | | | 3.2 | |
| | DPHA | | | | |
| | V4018 | | | | |
| | 17-813 | | | | |
| Photopolymerization initiator | I-184 | | 1.20 | 0.93 | 0.80 |
| | I-127 | | | | |
| UV absorber | TINUVIN 384 | | | | |
| | TINUVIN 400 | 0.53 | 0.60 | 0.48 | 0.44 |
| | TINUVIN 479 | | | | |
| Light stabilizer (HALS) | TINUVIN 123 | 0.27 | 0.30 | 0.24 | 0.22 |
| | TINUVIN 152 | | | | |
| Coating name | | Comparative coating-5 | Comparative coating-6 | Comparative coating-7 | Comparative coating-8 |
| Base material | PET | A4300 | | | |
| | PEN | | | Q51DW | |
| | PC | | LS2 | | LS2 |
| Evaluation of coating film | Crack resistance | Excellent | Poor | Poor | Excellent |
| | Change in haze value | 0.7 | 23 | 12 | 8.4 |
| | Anti-wet adhesion | 100 | 0 | 90 | 5 |
| | Abrasion resistance | 31 | 9.7 | 6.7 | 9.5 |

Abbreviations in Table 3 and Table 4
(a1): Abbreviation of the polysiloxane segment (a1)
*1: Content (%) of the polysiloxane segment (a1) with respect to the total solid content of the curable resin composition
*2: Content (%) of the polyisocyanate (B) with respect to the total solid content of the curable resin composition
*3: Content of the polysiloxane segment (a1) with respect to the total solid content of the composite resin (A)
DN-901S: BURNOCK DN-901S (a polyisocyanate manufactured by DIC Corporation)
DN-950: BURNOCK DN-950 (a polyisocyanate manufactured by DIC Corporation)
DN-955: BURNOCK DN-955 (a polyisocyanate manufactured by DIC Corporation)
V-4018: UNIDIC V-4018 (a urethane acrylate manufactured by DIC Corporation)
17-813: UNIDIC 17-813 (a urethane acrylate manufactured by DIC Corporation)
PETA: Pentaerythritol triacrylate
DPHA: Dipentaerythritol hexaacrylate
I-184: Irgacure 184 (a photopolymerization initiator manufactured by Ciba Japan K.K.).
I-127: Irgacure 127 (a photopolymerization initiator manufactured by Ciba Japan K.K.),
TINUVIN 479: (a hydroxyphenyltriazine-based UV absorber manufactured by Ciba Japan K.K.)
TINUVIN 152: (a hindered amine-based light stabilizer (HALS) manufactured by Ciba Japan K.K.)
A4300: Cosmoshine A4300 (a PET film (10 cm×10 cm×125 μm) manufactured by Toyobo Co., Ltd.)
Q65FA: Teonex Q65FA (a PEN film (10 cm×10 cm×100 μm) manufactured by Teijin Dupont Films Japan Limited)
LS2: Lexan LS2 (a polycarbonate sheet (10 cm×10 cm×2 mm) manufactured by SABIC Innovative Plastics)

As a result, all of the laminated plastics, the surfaces of which were coated with the clear coatings (Coating-9) to (Coating-16), and which were evaluated in Examples 9 to 16, showed no cracks after 3000 hours and a few changes in the haze value. This result indicates that these laminated plastics had excellent weather resistance.

The laminated plastic evaluated in Comparative Example 5 is an example in which the clear coating (R-1) which formed a cured coating film by the reaction between the resin (R-1) and the polyisocyanate at normal temperature was coated on the surface. It was inferior in weather resistance.

The laminated plastic evaluated in Comparative Example 6 is an example in which the clear coating (Comparative coating-6) having no polyisocyanate was coated on the surface. It was inferior in weather resistance and adhesion.

The laminate evaluated in Comparative Example 7 is an example in which the clear coating (Comparative coating-7) having too little polyisocyanate was coated on the surface. It was inferior in weather resistance.

The laminate evaluated in Comparative Example 8 is an example in which the clear coating (Comparative coating-8) having too much polysiloxane segment was coated on the surface. It was inferior in the adhesion between the cured coating film and the base material after the humidity resistance test.

INDUSTRIAL APPLICABILITY

Curable resin compositions of the present invention are applicable as coatings for the application to, for example: transport related equipment such as an automobile, a motorbike, a train, a bicycle, a ship, or an aircraft, and a variety of parts for use in these equipment; household electric appliances such as a television set, a radio, a refrigerator, a washing machine, an air conditioner, an outdoor unit of an air conditioner, or a computer, and a variety of parts for use in these appliances; building materials such as various kinds of windows, a window frame, a roofing material, an exterior wall material, a metal wall material, a door, or an interior wall material; various kinds of films for building materials such as clear films for windows, decoration films, and posters, which use a polyester resin film, an acrylic resin film, a fluorinated resin film, or the like, as a base material; various components of a solar light generating system, such as a front cover glass, a front protective sheet, a back protective sheet, and a seal material; components of a flat panel display, such as a protective film of a polarizing plate, an AR film, a polarizing plate, a phase difference film, a prism sheet, a diffuser film, and a diffuser panel; containers such as a plastic bottle and a metal can; and other coatings for musical instruments, office supplies, sports goods, and toys made of base materials mentioned above.

In particular, laminated plastics of the present invention are excellent in weather resistance and scratch resistance, and thus are applicable to plastic building materials for outside use such as a plastic as a substitute for a window glass, a resin sash, a resin siding material, and a resin roofing tile, as well as to plastic components of automobiles such as polycarbonate as a substitute for a window glass, a lens cover for a lamp, a plastic bumper, and a plastic body. Furthermore, these are also applicable to components of a solar light generating system which is expected to be used for a long period of time outside, such as a cover film for a surface glass, a front protective sheet, and a back protective sheet.

In addition, the curable resin compositions of the present invention includes a polysiloxane segment, which is highly resistant to oxidative decomposition reactions led by photocatalysts, as an essential component, and thus can also be applicable as coating paints as a barrier layer against photocatalysts. Furthermore, as to other applications, these curable resin compositions are also applicable to in a wide range of use in various kinds of adhesives, inks, gas barrier coating agents, impregnants for fibers or papers, surface treatment agents, and the like.

The invention claimed is:

1. A radiation curable resin composition comprising:
a composite resin (A) in which a polysiloxane segment (a1) having a polymerizable double bond, which has a structural unit represented by a general formula (1) and/or a general formula (2) as well as having a silanol group and/or a hydrolyzable silyl group, and a vinyl-based polymer segment (a2) having an alcoholic hydroxyl group are bound to each other through a bond represented by a general formula (3);
a polyisocyanate (B), and
a photopolymerization initiator, wherein
the content of said polysiloxane segment (a1) is from 10 to 60% by weight with respect to the total solid content of the curable resin composition,
the content of the polyisocyanate (B) is from 5 to 50% by weight with respect to the total solid content of the curable resin composition, and
the content of the polymerizable double bond in said polysiloxane segment (a1) is from 3 to 20% by weight

[Formula 1]

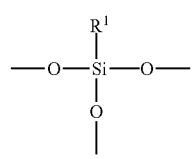

(1)

[Formula 2]

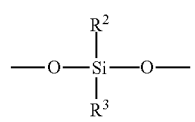

(2)

(in said general formulas (1) and (2), $R^1$, $R^2$, and $R^3$ represent, each independently, any one of: a group having a polymerizable double bond selected from the group consisting of $-R^4-CH=CH_2$, $-R^4-C(CH_3)=CH_2$, $-R^4-O-CO-C(CH_3)=CH_2$, and $-R^4-O-CO-CH=CH_2$ (provided that $R^4$ represents a single bond or an alkylene group of 1 to 6 carbon atoms); an alkyl group of 1 to 6 carbon atoms; a cycloalkyl group of 3 to 8 carbon atoms; an aryl group; or an aralkyl group of 7 to 12 carbon atoms, wherein at least one of $R^1$, $R^2$, and $R^3$ is said group having a polymerizable double bond)

[Formula 3]

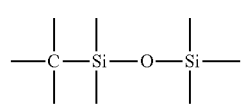

(3)

(in the general formula (3), the carbon atom constitutes a part of said vinyl-based polymer segment (a2), and the silicon atom which is only bound to the oxygen atom constitutes a part of said polysiloxane segment (a1)).

2. A radiation curable resin composition according to claim 1, wherein the content of said polysiloxane segment (a1) is from 30 to 80% by weight with respect to said composite resin (A).

3. A radiation curable resin composition according to claim 1, wherein said group having a polymerizable double bound is a group having a polymerizable double bond selected from the group consisting of $-R^4-O-CO-C(CH_3)=CH_2$ and $-R^4-O-CO-CH=CH_2$ (provided that $R^4$ represents a single bond or an alkylene group of 1 to 6 carbon atoms).

4. A radiation curable resin composition according to claim 1, wherein said vinyl-based polymer segment (a2) having an alcoholic hydroxyl group is an acrylic-based polymer segment.

5. A radiation curable resin composition according to claim 1, wherein said polyisocyanate (B) is an aliphatic polyisocyanate obtained from an aliphatic diisocyanate.

6. A radiation curable resin composition according to claim 1, wherein a polyfunctional (meth)acrylate is contained.

7. A coating comprising the radiation curable resin composition according to claim 1.

8. A laminated plastic which is formed by laminating a layer made of the radiation curable resin composition according to claim 1.

* * * * *